United States Patent
Togawa et al.

(10) Patent No.: US 10,861,477 B2
(45) Date of Patent: Dec. 8, 2020

(54) RECORDING MEDIUM RECORDING UTTERANCE IMPRESSION DETERMINATION PROGRAM BY CHANGING FUNDAMENTAL FREQUENCY OF VOICE SIGNAL, UTTERANCE IMPRESSION DETERMINATION METHOD BY CHANGING FUNDAMENTAL FREQUENCY OF VOICE SIGNAL, AND INFORMATION PROCESSING APPARATUS FOR UTTERANCE IMPRESSION DETERMINATION BY CHANGING FUNDAMENTAL FREQUENCY OF VOICE SIGNAL

(71) Applicant: FUJITSU LIMITED, Kawasaki (JP)

(72) Inventors: Taro Togawa, Kawasaki (JP); Sayuri Nakayama, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 16/143,537

(22) Filed: Sep. 27, 2018

(65) Prior Publication Data
US 2019/0027158 A1    Jan. 24, 2019

Related U.S. Application Data

(63) Continuation of application No. PCT/JP2016/060565, filed on Mar. 30, 2016.

(51) Int. Cl.
*G10L 25/63* (2013.01)
*G10L 21/013* (2013.01)
*H04M 1/00* (2006.01)
*H04M 1/24* (2006.01)
(Continued)

(52) U.S. Cl.
CPC ............ *G10L 21/013* (2013.01); *G10L 25/51* (2013.01); *G10L 25/63* (2013.01); *G10L 25/78* (2013.01); *H04M 1/00* (2013.01); *H04M 1/24* (2013.01); *G10L 25/90* (2013.01); *G10L 2021/0135* (2013.01)

(58) Field of Classification Search
CPC .............................. G10L 21/013; G10L 25/63
(Continued)

(56) References Cited

U.S. PATENT DOCUMENTS 6,151,571 A   11/2000 Pertrushin
7,219,059 B2   5/2007 Gupta et al.
(Continued)

FOREIGN PATENT DOCUMENTS

JP   08-44395       2/1996
JP   2003-508805    3/2003
(Continued)

OTHER PUBLICATIONS

EESR—Extended European Search Report of European patent Application No. 16896881.6 dated Mar. 14, 2019. * Reference JP2006-267465 cited in EESR was previously filed in the IDS dated Sep. 27, 2018.
(Continued)

*Primary Examiner* — Susan I McFadden
(74) *Attorney, Agent, or Firm* — Fujitsu Patent Center

(57) ABSTRACT

A non-transitory computer-readable recording medium records a program for causing a computer to execute an utterance impression determination process. The utterance impression determination process includes specifying a current fundamental frequency from a voice signal which is received, calculating a relaxation value by changing the current fundamental frequency in chronological order so that the change in the current fundamental frequency becomes moderate, and evaluating the voice signal based on a degree
(Continued)

of a magnitude of a difference between at least one feature amount associated with the current fundamental frequency and the relaxation value corresponding to the feature amount.

17 Claims, 18 Drawing Sheets

(51) Int. Cl.
  *G10L 25/51* (2013.01)
  *G10L 25/78* (2013.01)
  *G10L 25/90* (2013.01)

(58) Field of Classification Search
  USPC .......................................................... 704/208
  See application file for complete search history.

(56) References Cited

U.S. PATENT DOCUMENTS 7,590,526 B2 * 9/2009 Fukuda ......................... 704/211
7,856,353 B2 * 12/2010 Fukuda .................. G10L 15/20
  381/63

| | | |
|---|---|---|
| 2002/0194002 A1 | 12/2002 | Petrushin |
| 2011/0071825 A1 | 3/2011 | Emori et al. |
| 2013/0006630 A1 | 1/2013 | Hayakawa et al. |
| 2013/0080169 A1 | 3/2013 | Harada et al. |

FOREIGN PATENT DOCUMENTS

| | | |
|---|---|---|
| JP | 2006-267465 | 10/2006 |
| JP | 2008-134557 | 6/2008 |
| JP | 2009-251469 | 10/2009 |
| JP | 2010-210730 | 9/2010 |
| JP | 2013-072979 | 4/2013 |
| WO | 2009/145192 | 12/2009 |

OTHER PUBLICATIONS

Sundberg, "The Science of the Singing Voice", Tokyo Denki University Press, 2007, pp. 36, lines 17-21 (7 pages).
International Search Report and Written Opinion of the International Searching Authority, mailed in connection with PCT/JP2016/060565 and dated Jun. 14, 2016 (12 pages).

* cited by examiner

RECORDING MEDIUM RECORDING UTTERANCE IMPRESSION DETERMINATION PROGRAM BY CHANGING FUNDAMENTAL FREQUENCY OF VOICE SIGNAL, UTTERANCE IMPRESSION DETERMINATION METHOD BY CHANGING FUNDAMENTAL FREQUENCY OF VOICE SIGNAL, AND INFORMATION PROCESSING APPARATUS FOR UTTERANCE IMPRESSION DETERMINATION BY CHANGING FUNDAMENTAL FREQUENCY OF VOICE SIGNAL

CROSS-REFERENCE TO RELATED APPLICATION(S)

This application is a continuation application of International Application PCT/JP2016/060565 filed on Mar. 30, 2016 and designated the U.S., the entire contents of which are incorporated herein by reference.

FIELD

The embodiments relate to an utterance impression determination program, an utterance impression determination method, and an information processing apparatus.

BACKGROUND

For example, in a case where an operator speaks with a customer at a call center, an operator's voice affects an impression that the customer receives.

Related art is disclosed in, for example, Japanese Laid-open Patent Publication No. 2006-267465, Japanese Laid-open Patent Publication No. 2008-134557, Japanese Laid-open Patent Publication No. 8-44395, International Publication Pamphlet No. WO 2009/145192, or non-patent literature: Sundberg, "The Science of the Singing Voice", Tokyo Denki University Press, 2007.

SUMMARY

According to one aspect of the embodiments, a non-transitory computer-readable recording medium that records a program for causing a computer to execute an utterance impression determination process of: specifying a current fundamental frequency from a voice signal which is received, calculating a relaxation value by changing the current fundamental frequency in chronological order so that the change in the current fundamental frequency becomes moderate, and evaluating the voice signal based on a degree of a magnitude of a difference between at least one feature amount associated with the current fundamental frequency and the relaxation value corresponding to the feature amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, if a degree of a tone of the operator's voice is high, the customer often has a good impression on a call with the operator. Therefore, there exists a technique for objectively determining the degree of the tone of the operator's voice in order to evaluate a correspondence of the operator to the customer. In the technique, for example, based on a difference between a maximum value and a minimum value of a fundamental frequency of the operator's voice, in a case where the difference is large, it is determined that the degree of the tone of the operator's voice is large.

However, in an utterance with a long duration of the utterance, since expiration from the lung is reduced, a vibration frequency of vocal folds decreases as a pressure to a glottis decreases, and the fundamental frequency of the voice tends to gradually decline. Therefore, in the utterance with the long duration of the utterance, in a case where the degree of the tone of the operator's voice is determined based on a difference between a maximum value and a minimum value of the fundamental frequency, there is a possibility that the operator's voice having a low tone is determined to have a high tone.

For example, the impression of the voice tone received by a listener changes based on a magnitude of a change in the fundamental frequency in a short time. On the other hand, in the utterance with the long duration of the utterance, since the fundamental frequency of the voice tends to gradually decrease, there is a high possibility that the maximum value of the fundamental frequency exists near a start of utterance and the minimum value of the fundamental frequency exists near an end of the utterance. In this case, the magnitude of the change in the fundamental frequency in a short time does not appear in the difference between the maximum value and the minimum value of the fundamental frequency. Therefore, there is a possibility that the operator's voice having the low tone is determined to have a high tone.

For example, a determination accuracy of the utterance impression may be improved.

First Embodiment

Hereinafter, a first embodiment which is an example of the disclosed technology will be described.

Figure 1:
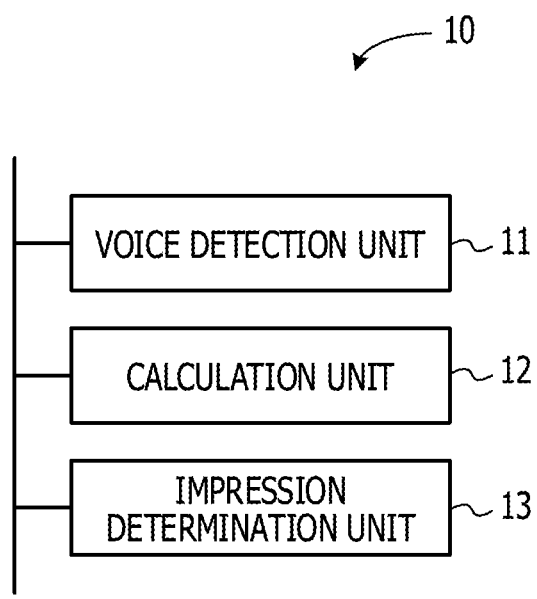
FIG. 1 is a block diagram illustrating an example of a main part function of an utterance impression determination device according to first to third embodiments.

As an example, FIG. 1 illustrates an utterance impression determination device 10. The utterance impression determination device 10 includes, for example, a voice detection unit 11, a calculation unit 12, and an impression determination unit 13. The voice detection unit 11, the calculation unit 12, and the impression determination unit 13 are connected to each other.

The voice detection unit 11 detects a user's uttered voice. The calculation unit 12 specifies a fundamental frequency from a voice signal that received, and calculates a relaxation value by changing the fundamental frequency in chronological order so that the change in the specified fundamental frequency moderate. The impression determination unit 13 evaluates the voice signal based on the degree of the magnitude of the difference between the at least one feature amount related to the fundamental frequency and the relaxation value corresponding to the feature amount.

The utterance impression determination device 10 may be, for example, a personal computer or a dedicated device connectable to a fixed telephone, a smartphone, a mobile phone, or the like, or may be a part of a fixed telephone, a smartphone, a mobile phone, or the like.

Figure 2:
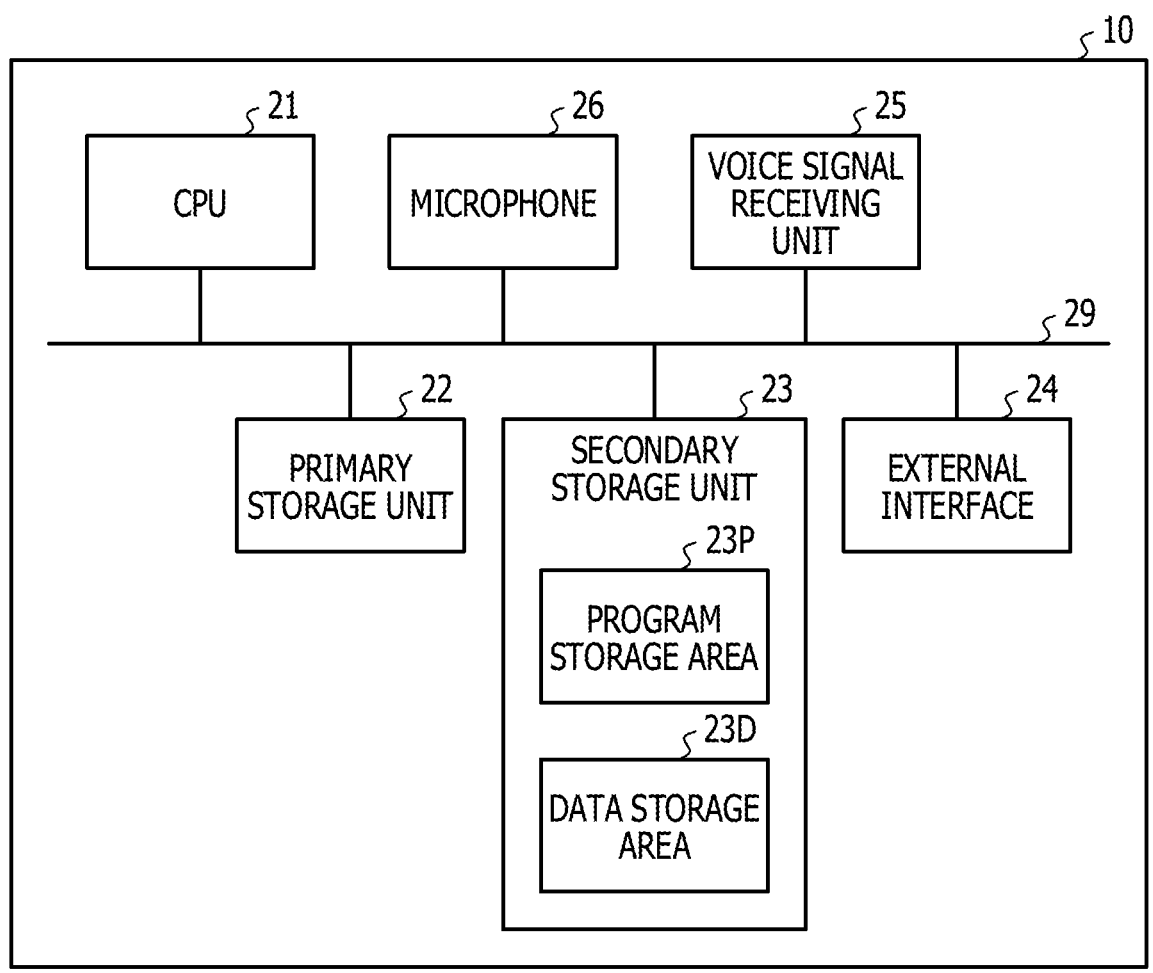
FIG. 2 is a block diagram illustrating an example of a hardware configuration of the utterance impression determination device according to the first to third embodiments.

As illustrated in FIG. 2 as an example, the utterance impression determination device 10 includes, for example, a central processing unit (CPU) 21, a primary storage unit 22, a secondary storage unit 23, an external interface 24, a voice signal receiving unit 25, a microphone 26. The CPU 21, the primary storage unit 22, the secondary storage unit 23, the external interface 24, the voice signal receiving unit 25, and the microphone 26 are mutually connected via a bus 29.

An external device is connected to the external interface 24, and the external interface 24 controls transmission and reception of various information items between the external device and the CPU 21.

The microphone 26 receives a voice of the user side, for example, utterance voice of an operator of a call center using the utterance impression determination device 10, and converts the utterance voice into a voice signal. In FIG. 2, the microphone 26 is illustrated to be included in the utterance impression determination device 10. However, the present embodiment is not limited thereto. For example, the microphone 26 may be a microphone of a telephone device such as a telephone connected to the utterance impression determination device 10, or may be an external microphone connected via the external interface 24.

The voice signal receiving unit 25 receives the voice signal representing a voice uttered by a calling party side, for example, a customer who talks to the operator, which is transmitted by wired or wirelessly, such as a telephone line or the Internet line.

The primary storage unit 22 is a volatile memory such as a random access memory (RAM), for example. The secondary storage unit 23 is a nonvolatile memory such as a hard disk drive (HDD) or a solid state drive (SSD), for example. The secondary storage unit 23 includes, for example, a program storage area 23P for storing an utterance impression determination program and a data storage area 23D for storing various data items. The utterance impression determination program may be read from a non-transitory storage medium such as a CD-ROM or a DVD via the external interface 24, or may be received from an external server.

The CPU 21 reads the utterance impression determination program from the secondary storage unit 23 and develops the program in the primary storage unit 22. By executing the utterance impression determination program, the CPU 21 operates as the calculation unit 12 and the impression determination unit 13 illustrated in FIG. 1.

Next, the outline of the utterance impression determination process executed by the utterance impression determination device 10 will be described. The utterance impression determination device 10 determines the utterance impression that the user's utterance gives to the calling party.

Figure 3:
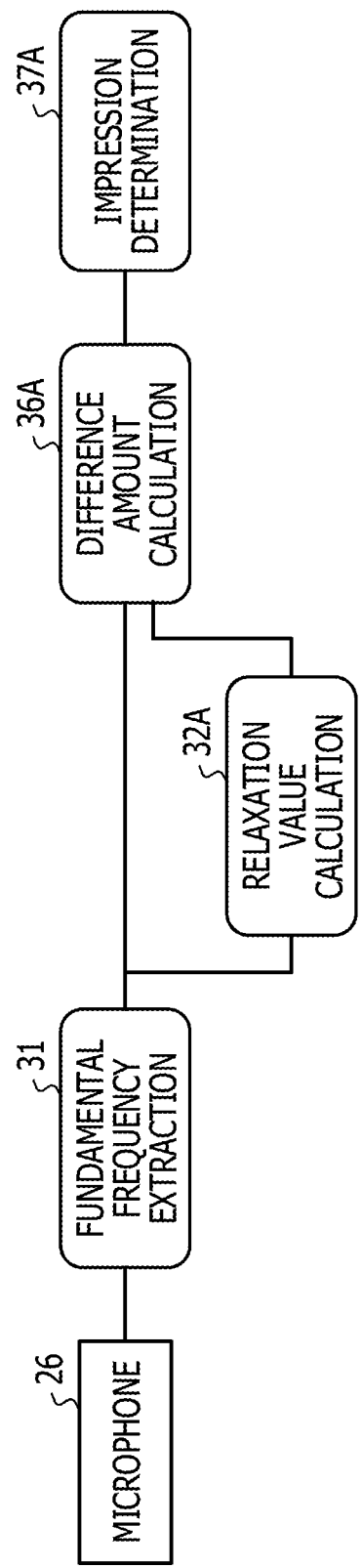
FIG. 3 is a block diagram for illustrating an outline of an example of an utterance impression determination process to the first embodiment.

As illustrated in FIG. 3, the utterance impression determination device 10 acquires the user's uttered voice with the microphone 26. In a block 31, the utterance impression determination device 10 extracts the fundamental frequency from the voice signal corresponding to the user's uttered voice. In a block 32A, the utterance impression determination device 10 calculates the relaxation value by changing the fundamental frequency in chronological order so that the change in the fundamental frequency becomes moderate. The utterance impression determination device 10 calculates a difference amount representing a degree of the magnitude of the difference between the fundamental frequency and the relaxation value corresponding to the fundamental frequency in a unit of time described later in a block 36A. The utterance impression determination device 10 determines an utterance impression per unit time based on the difference amount calculated in the block 36A in a block 37A.

Figure 4:
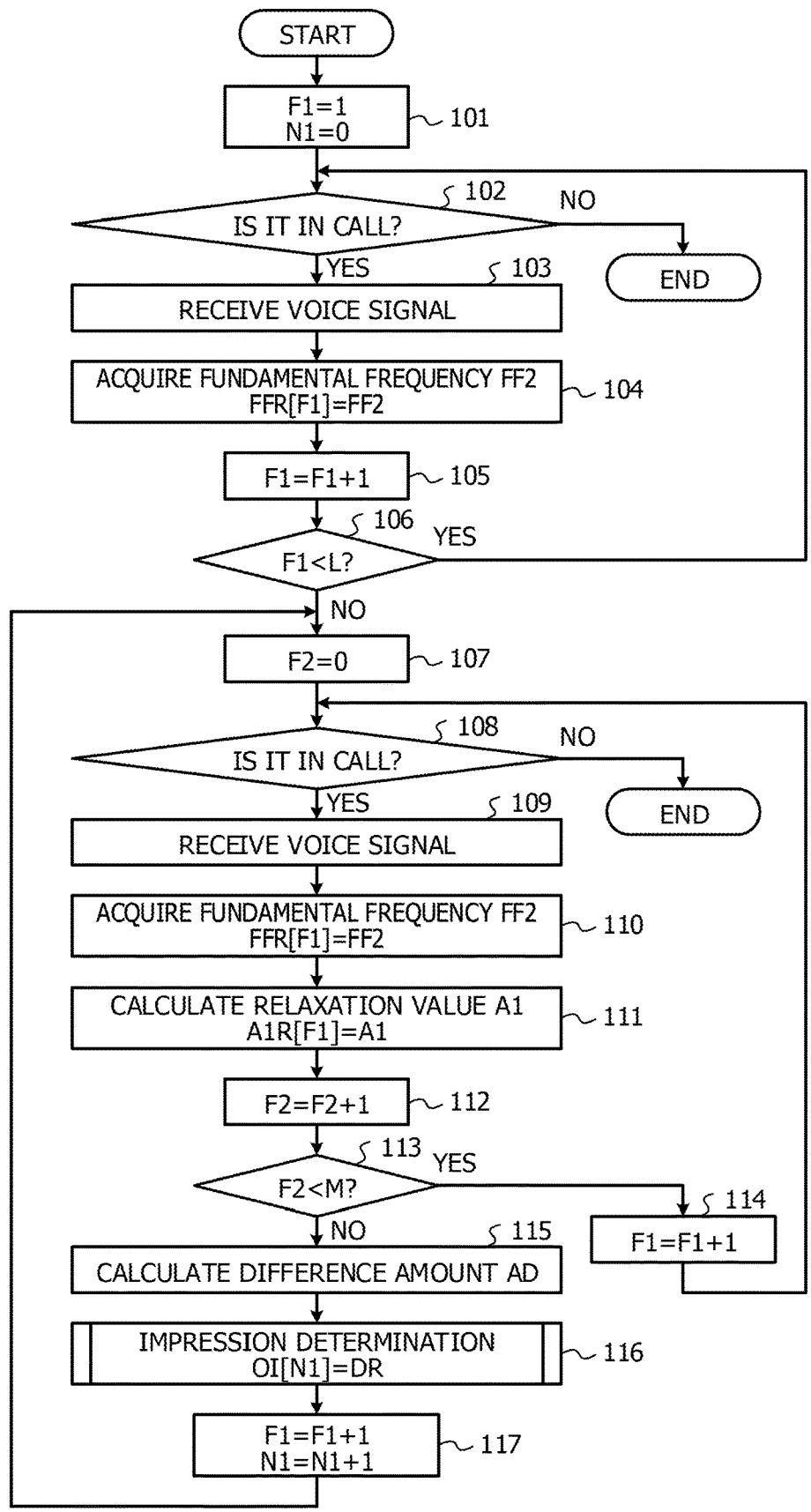
FIG. 4 is a flowchart illustrating an example of the utterance impression determination process according to the first embodiment.

Next, the utterance impression determination process performed by the utterance impression determination device 10 will be described as an operation of the present embodiment. FIG. 4 illustrates an example of the utterance impression determination process performed by the utterance impression determination device 10.

For example, by turning on a power supply of the utterance impression determination device 10 in a state where the user started a call, the utterance impression determination process of FIG. 4 is started. In step 101, the CPU 21 sets 1 to a counter F1 for counting the number of voice frames (hereinafter, also referred to as a first frame counter F1), and sets 0 to a counter N1 (hereinafter, also referred to as a unit time counter N1) for counting the number of unit times. The first frame counter F1 and the unit time counter N1 are included in the data storage area 23D of the secondary storage unit 23, for example.

In step 102, the CPU 21 determines whether it is in a call. In a case where the determination is denied, that is, in a case where it is not in a call, the CPU 21 ends the utterance impression determination process. In a case where the determination is affirmative, that is, in a case where it is in a call, the process proceeds to step 103.

In step 103, the CPU 21 receives the voice signal for one frame. The time length of one frame is, for example, 10 milliseconds. The voice signal is a voice corresponding to the voice detected by the microphone 26, that is, the user's uttered voice, and is temporarily saved in the data storage area 23D of the secondary storage unit 23, for example.

Figure 5:
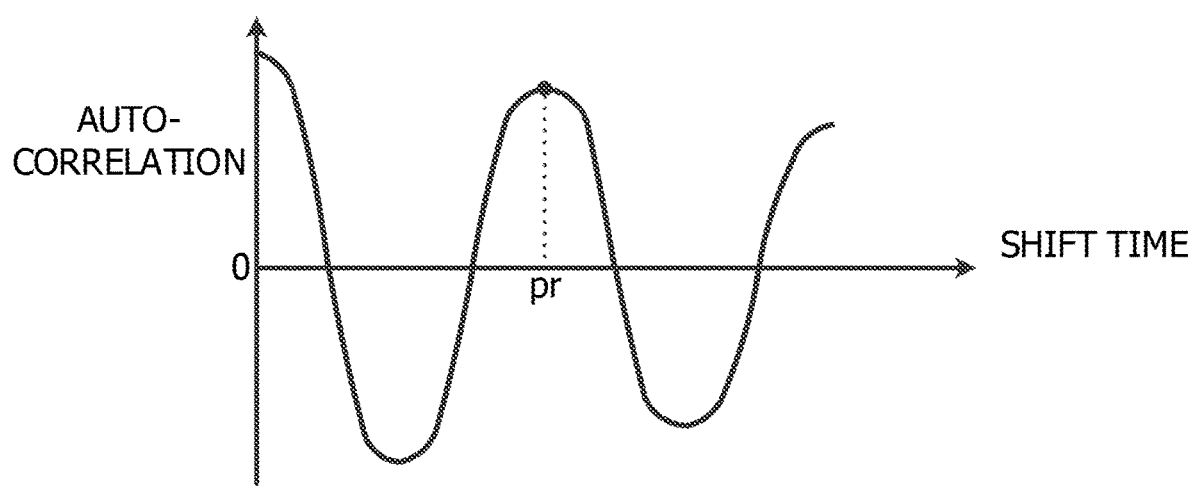
FIG. 5 is a conceptual diagram for illustrating a process of acquiring a fundamental frequency according to the first to third embodiments.

In step 104, the CPU 21 acquires a fundamental frequency FF2 of the voice signal. Specifically, first, the fundamental frequency FF1 of the voice signal is obtained, for example, as described below. The auto-correlation of the voice signal is calculated, and as illustrated in FIG. 5, a period in which a shift time is positive and the auto-correlation value becomes the maximum value at a minimum position is set as a fundamental period pr. The fundamental frequency FF1 is calculated by dividing a sampling frequency Fs by the fundamental period pr as illustrated in Equation (1).

$$FF1 = Fs/pr \qquad (1)$$

The sampling frequency Fs is, for example, 8,000 Hz.

Next, as illustrated in Equation (2), the CPU 21 converts the fundamental frequency FF1 of the voice signal which is the unit Hz to the fundamental frequency FF2 of the voice signal which is a unit semitone adapted to a height on the human auditory sense.

$$FF2 = 12 \times \log_2(FF1/50) \qquad (2)$$

The CPU 21 stores the fundamental frequency FF2 acquired by the conversion in an array FFR [F1]. The FFR may be, for example, an array included in the data storage area 23D of the secondary storage unit 23. As described above, the first frame counter F1 stores the count value of the voice frame.

In step 105, the CPU 21 adds 1 to the first frame counter F1. In step 106, the CPU 21 determines whether the count value of the voice frame stored in the first frame counter F1 is smaller than a predetermined number of frames L. L may be, for example, 50. In a case where the determination is affirmative, that is, in a case where the count value of the voice frame is smaller than the predetermined number of frames L, the CPU 21 returns to step 102 and repeats the processes from step 102 to step 105. On the other hand, in a case where the determination is denied, that is, in a case where the count value of the voice frame is equal to or more than the predetermined number of frames L, the CPU 21 proceeds to step 107.

In step 107, the CPU 21 sets 0 in the counter F2 for counting the number of voice frames (hereinafter, also referred to as a second frame counter F2). It is determined whether the number of frames has reached the predetermined number of frames M corresponding to the unit time for determining the utterance impression based on the count value of the second frame counter F2, as described later.

In step 108, the CPU 21 determines whether it is in a call. In a case where the determination is denied, that is, in a case where it is not in a call, the CPU 21 ends the utterance impression determination process. In a case where the determination in step 108 is affirmative, that is, in a case where it is not in a call, the CPU 21 proceeds to step 109. Since step 109 is the same as step 103 described above, and step 110 is similar to step 104 described above, the description thereof will be omitted.

In step 111, the CPU 21 calculates a relaxation value A1. The relaxation value is, for example, a moving average value for calculating the average value of the fundamental frequency FF2 (stored in the array FFR) for L frames backward from the current fundamental frequency FF2 as illustrated in Equation (3). Here, the L frame is an example of a section of a part of the voice signal, and as described above, L may be 50, for example.

[Math. 1]

$$A1 = \frac{1}{L}\sum_{i=0}^{L-1} FFR[F1-i] \qquad (3)$$

Next, the CPU 21 stores the obtained relaxation value A1 in an array MR [F1]. The MR may be, for example, an arrangement included in the data storage area 23D of the secondary storage unit 23. As described above, the first frame counter F1 stores the count value of the voice frame.

In step 112, the CPU 21 adds 1 to the second frame counter F2. In step 113, the CPU 21 determines whether the count value stored in the second frame counter F2 is smaller than M. M is a predetermined number of frames corresponding to the unit time for determining the above-described utterance impression, and for example, M may be 300. A value larger than L is used for M.

In a case where the determination in step 113 is affirmative, that is, in a case where the count value stored in the second frame counter F2 is smaller than M, the CPU 21 adds 1 to the count value of the first frame counter F1 in step 114, the process returns to step 108. In a case where the determination in step 113 is denied, that is, in a case where the count value stored in the second frame counter F2 is greater than or equal to M, the CPU 21 calculates a difference amount AD in step 115. Here, as illustrated in Equation (4), the difference amount AD between the fundamental frequency FF2 stored in the array FFR for M frames backward from the current voice frame and the relaxation value A1 stored in the array MR is calculated.

[Math. 2]

$$AD = \frac{1}{M}\sqrt{\sum_{i=0}^{M-1}(FFR[F1-i]-A1R[F1-i])^2} \qquad (4)$$

That is, in Equation (4), a difference amount AD which is a degree indicating a degree of the magnitude of the difference between each of the fundamental frequencies FF2 per unit time and each of the relaxation values A1 corresponding to each of the fundamental frequencies FF2 is calculated.

Figure 6:
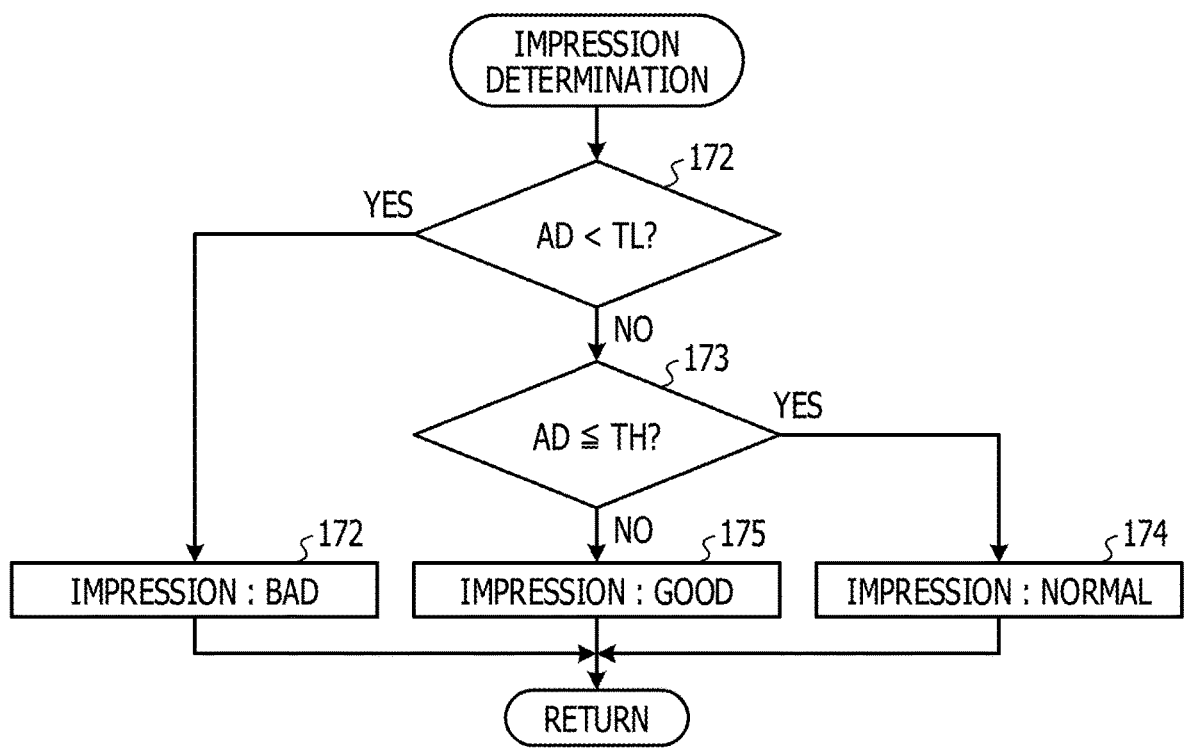
FIG. 6 is a flowchart illustrating an example of an impression determination process according to the first to third embodiments.

In step 116, the CPU 21 determines the utterance impression based on the calculated difference amount AD. Details of step 116 are illustrated in FIG. 6. In step 171, the CPU 21 determines whether the difference amount AD is smaller than a predetermined first threshold value TL which is an example of the threshold value. In a case where the determination in step 171 is affirmative, that is, in a case where the difference amount AD is smaller than the predetermined first threshold TL, the CPU 21 determines that the utterance impression is bad in step 172 and sets a utterance impression DR in an array OI [N1] proceeds to step 117. For example, the utterance impression DR may be an alphabetic character B indicating that the utterance impression is bad, or may be a numerical value −1. The OI may be, for example, an arrangement included in the data storage area 23D of the secondary storage unit 23.

In a case where the determination in step 171 is denied, that is, in a case where the calculated difference amount AD is equal to or larger than the first threshold TL, in step 173, the CPU 21 determines that the calculated difference amount AD is equal to or less than a predetermined second threshold TH. The second threshold value TH is a value larger than the first threshold value. In a case where the determination in step 173 is affirmative, that is, in a case where the calculated difference amount AD is less than or equal to the second threshold value TH, the CPU 21 determines that the utterance impression is normal in step 174 and sets the utterance impression DR in the array OI [N1], and proceeds to step 117. For example, the utterance impression DR may be an alphabetic character O indicating that the utterance impression is normal, or may be a numerical value 0.

In a case where the determination in step 173 is denied, that is, in a case where the calculated difference amount AD is larger than the second threshold value TH, the CPU 21 determines that the utterance impression is good in step 175 and sets the utterance impression DR in the array OI [N1], and proceeds to step 117. For example, the utterance impression DR may be an alphabetic character G indicating that the utterance impression is good, or it may be a numerical value 1.

For example, the first threshold value TL may be 1.5 [semitone], and the second threshold value TH may be 3.0 [semitone], for example. In step 117, the CPU 21 adds 1 to the count value of the first frame counter F1, adds 1 to the count value of the unit time counter N1, and returns to step 107.

In the present embodiment, an example in which the utterance impression of the voice corresponding to the voice signal is determined was described based on the difference amount representing the degree of magnitude of the difference between each of the fundamental frequencies and each of the relaxation values corresponding to each of the fundamental frequencies. However, the present embodiment is not limited thereto. For example, the utterance impression of the voice corresponding to the voice signal may be determined based on the difference amount representing the degree of the magnitude of the difference between each of the fundamental frequencies larger than each of the corresponding relaxation values and each of the relaxation values corresponding to each of the fundamental frequencies.

In the present embodiment, the calculation unit specifies the fundamental frequency from the received voice signal, and calculates the relaxation value in chronological order by changing the fundamental frequency so that the change in the specified fundamental frequency becomes moderate. The impression determination unit evaluates the voice signal based on the degree of the magnitude of the difference between the at least one feature amount related to the fundamental frequency and the relaxation value corresponding to the feature amount. In the present embodiment, the relaxation value is a moving average value of the fundamental frequency of a section of the voice signal.

In the present embodiment, the feature amount is the fundamental frequency specified from the voice signal. In the present embodiment, the difference amount representing the degree of the difference between at least one feature amount related to the fundamental frequency and the relaxation value corresponding to the feature amount is the square root of the sum of squares of the difference between the feature amount per unit time of impression determination and the relaxation value corresponding to the feature amount. In the present embodiment, the impression determination unit determines that the impression is bad in a case where the difference amount is smaller than the threshold value, and determines that the impression is good in a case where the difference amount is larger than the threshold value by a predetermined value or more.

In the present embodiment, by evaluating the voice signal based on the degree of the magnitude of the difference between the feature amount and the relaxation value corresponding to the feature amount, it is possible to improve the determination accuracy of the utterance impression. That is, in the present embodiment, it is possible to suppress erroneously determining a low tone voice as being a high tone voice even when the utterance duration is long and the fundamental frequency has a tendency to gradually decrease.

Second Embodiment

Next, a second embodiment which is an example of the disclosed technology will be described. Descriptions of the same configuration and operation as those of the first embodiment will be omitted.

Figure 7:
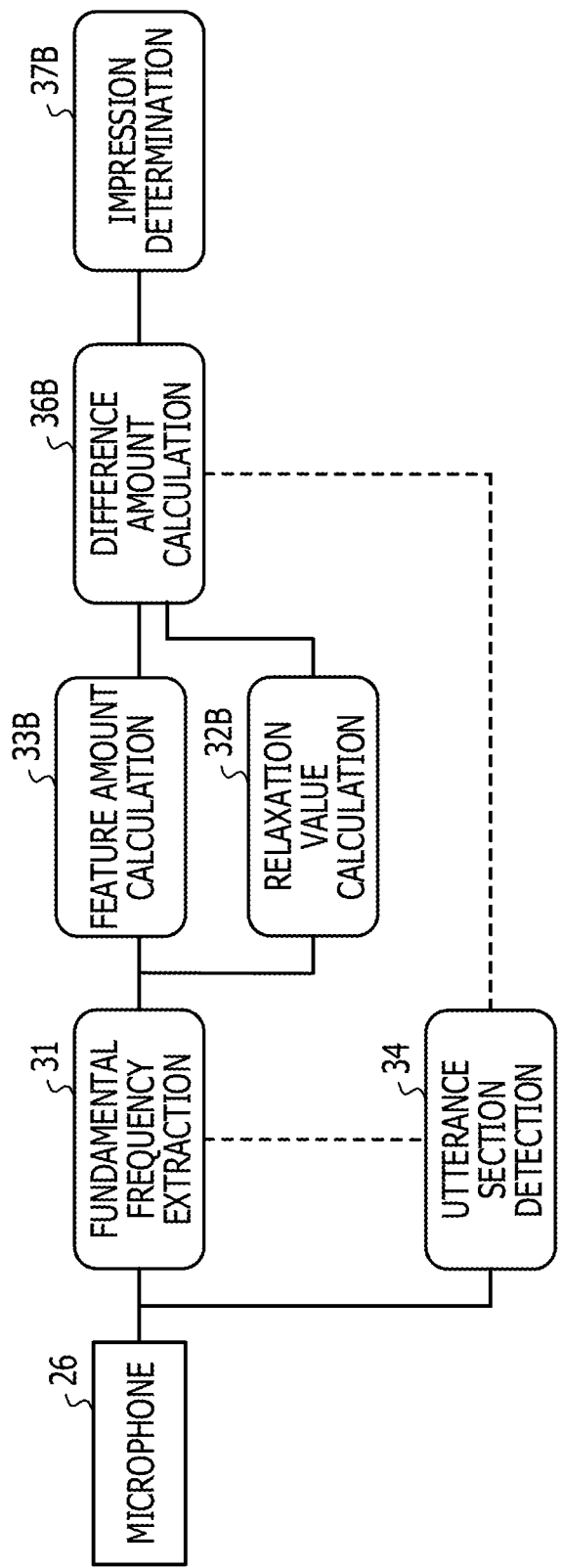
FIG. 7 is a block diagram for illustrating an outline of an example of the utterance impression determination process according to the second embodiment.

In the present embodiment, as illustrated in FIG. 7, the utterance impression determination device 10 acquires the user's uttered voice with the microphone 26. The utterance impression determination device 10 detects an utterance section in a block 34. The utterance section is a section including the user's uttered voice.

When it is detected in the block 34 that it is an utterance section, in the block 31, the utterance impression determination device 10 extracts the fundamental frequency from the voice signal corresponding to the user's uttered voice. In the block 32B, the utterance impression determination device 10 calculates a relaxation value obtained by changing the fundamental frequency in chronological order so that the change in the fundamental frequency becomes gentle, and calculates the feature amount related to the fundamental frequency in a block 33B.

If the utterance section is not detected at the block 34, that is, if the end of the utterance section is detected, in a block 36B, the utterance impression determination device 10 calculates a difference amount representing the degree of the magnitude of the difference between the feature amount and the relaxation value corresponding to the feature amount for each unit utterance section. In a block 37B, the utterance impression determination device 10 determines the utterance impression for each unit utterance section based on the difference amount for each unit utterance section.

Figure 8:
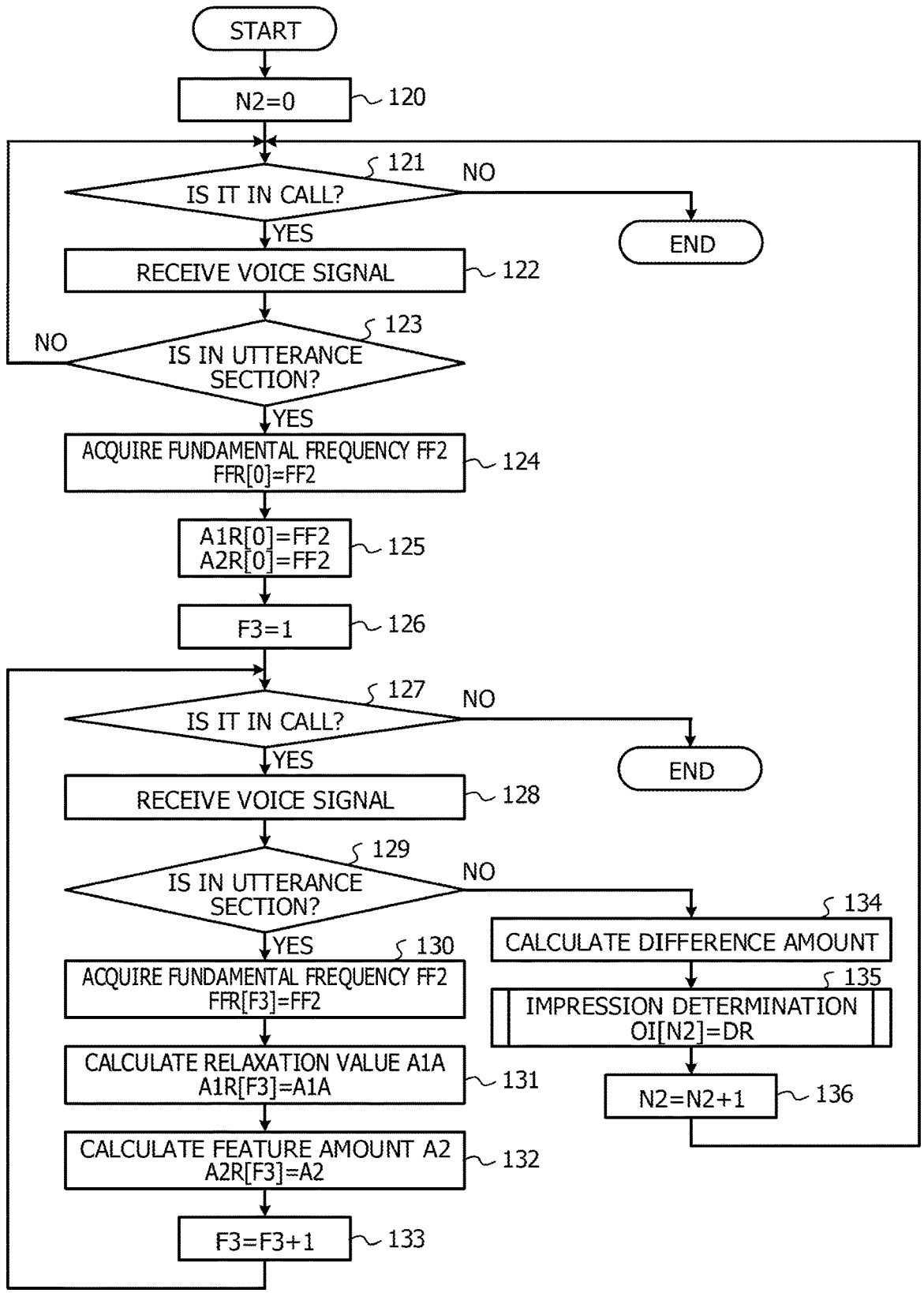
FIG. 8 is a flowchart illustrating an example of the utterance impression determination process according to the second embodiment.

Next, the utterance impression determination process performed by the utterance impression determination device 10 will be described as an operation of the present embodiment. FIG. 8 illustrates an example of the utterance impression determination process performed by the utterance impression determination device 10.

For example, by turning on the power of the utterance impression determination device 10 in a state where the user has started a call, the utterance impression determination process in FIG. 8 is started. In step 120, the CPU 21 sets 0 to a counter N2 (hereinafter, also referred to as a unit utterance section counter N2) for counting the number of unit utterance sections. In step 121, the CPU 21 determines whether it is in a call. In a case where the determination is denied, that is, in a case where it is not in a call, the CPU 21 ends the utterance impression determination process, and when the in a case where the determination is affirmative, that is, it is in a call, the process proceeds to step 122.

In step 122, the CPU 21 receives the voice signal for one frame. The time length of one frame is, for example, 10 milliseconds. The voice signal is a voice signal detected by the microphone 26, that is, the voice signal corresponding to the user's uttered voice, and is temporarily stored in the data storage area 23D of the secondary storage unit 23, for example.

In step 123, the CPU 21 determines whether the voice represented by the voice signal received in step 122 is the voice in the utterance section. For example, in a case where the power or voice-to-noise ratio of the voice signal received in step 123 is greater than a predetermined value, it is determined that the voice represented by the voice signal is the utterance section including not only background noise but also user's uttered voice.

In a case where the determination in step 123 is denied, that is, in a case where the voice represented by the voice signal received in step 122 is not the voice in the utterance section, the CPU 21 returns to step 121. On the other hand, in a case where the determination in step 123 is affirmative, that is, in a case where the voice represented by the voice signal received in step 122 is the voice in the utterance section, the CPU 21 proceeds to step 124.

In step 124, the CPU 21 acquires the fundamental frequency FF2 of the voice signal. The acquisition of the fundamental frequency FF2 is similar to step 104 of FIG. 4, so a detailed description thereof will be omitted.

The CPU 21 stores the acquired fundamental frequency FF2 in the array FFR [0]. As described above, the FFR may be, for example, an array included in the data storage area 23D of the secondary storage unit 23.

In step 125, the CPU 21 stores the fundamental frequency FF2 obtained in step 124 as an initial value of the relaxation value in the array A1R [0], and also stores the fundamental frequency FF2 acquired in step 124 as the initial value of the feature amount in the array A2R [0] and stores the frequency FF2. As described above, the array A1R may be, for example, an array included in the data storage area 23D of the secondary storage unit 23, and the array A2R may also be, for example, an array included in the data storage area 23D. In addition, in step 126, the CPU 21 sets 1 to F3 (hereinafter, also referred to as third frame counter) which is a counter for counting the number of voice frames.

In step 127, the CPU 21 determines whether it is in a call. In a case where the determination is denied, that is, in a case where it is not in a call, the CPU 21 ends the utterance impression determination process. If the determination in step 127 is affirmative, that is, in a case where it is not in a call, the CPU 21 receives the voice signal in step 128. Since step 128 is similar to step 122 above, the detailed description will be omitted.

In step 129, the CPU 21 determines whether the voice represented by the voice signal received in step 128 is the voice in the utterance section. Since step 129 is similar to the above step 123, the detailed description thereof will be omitted. In a case where the determination in step 129 is affirmed, that is, in a case where the voice represented by the voice signal received in step 129 is the voice in the utterance section, the CPU 21 acquires the fundamental frequency FF2 in step 130. Since the acquisition of the fundamental frequency FF2 is similar to step 104 of FIG. 4, the detailed description thereof will be omitted. The acquired fundamental frequency FF2 is stored in the array FFR [F3].

In step 131, the CPU 21 calculates the relaxation value A1A. For example, as illustrated in Equation (5), the relaxation value A1A is a difference between the current fundamental frequency, that is, the fundamental frequency stored in the array FFR [F3] and the relaxation value in the past, that is, the array A1R [F3−1] and the relaxation value stored in the weighted average value.

$$A1A = R1 \times A1R[F3-1] + (1-R1) \times FFR[F3] \tag{5}$$

R1, which is an example of a long-term weighting coefficient for changing the fundamental frequency so that the change in the fundamental frequency becomes gentle, is smaller than 1 and larger than 1−R1. The calculated relaxation value A1A is stored in the array A1R [F3].

In step 132, the CPU 21 calculates a feature amount A2. As illustrated in Equation (6), for example, the feature amount A2 is a weighted average value of a weight of the current fundamental frequency, that is, the fundamental frequency stored in the array FFR [F3] and the past feature amount, that is, the feature amount stored in the array A2R [F3−1].

$$A2 = R2 \times A2R[F3-1] + (1-R2) \times FFR[F3] \tag{6}$$

R2, which is an example of short-term weighting coefficients that change the fundamental frequency so that the change in the fundamental frequency becomes gentle, is smaller than R1 and larger than 1−R2. The calculated feature amount A2 is stored in the array A2R [F3]. R1 may be, for example, 0.9, and R2 may be, for example, 0.6.

As described above, in the Equation (5) for calculating the relaxation value, the long-term weighting coefficient R1 for the past relaxation value is larger than a short-term weighting coefficient R2 for the past feature amount in the Equation (6) for calculating the feature amount large. Therefore, the influence of the past relaxation value on the current relaxation value is larger than the influence on the current feature amount of the past feature amount.

In step 133, the CPU 21 adds 1 to the count value of a third frame counter F3 and returns to step 127. On the other hand, if the determination in step 129 is denied, that is, if the voice represented by the voice signal received in step 128 is not the voice in the utterance section, as illustrated in Equation (7), the CPU 21 calculates the difference amount AD2 in step 134.

[Math. 3]

$$AD2 = \frac{1}{F3-1} \sqrt{\sum_{i=1}^{F3-1} (A2R[i] - A1R[i])^2} \tag{7}$$

In Equation (7), a difference amount AD2 representing the degree of the magnitude of the difference between each of the feature amounts for each unit utterance section and each of the relaxation values corresponding to each of the feature amounts is calculated.

In step 135, the CPU 21 determines the utterance impression based on the calculated difference amount AD 2. Since step 135 is similar to step 116 in FIG. 4, so a detailed description thereof will be omitted. The utterance impression DR is stored in the array OI [N2].

In step 136, the CPU 21 adds 1 to the count value of the unit utterance section counter N2 and returns to step 121.

In this embodiment, an example in which the utterance impression of the voice corresponding to the voice signal is determined has been described based on the difference amount representing the degree of the magnitude of the difference between each of the feature amounts and each of the relaxation values corresponding to the feature amount. However, in the present embodiment, it is not limited thereto. For example, the utterance impression of the voice corresponding to the voice signal may be determined based on the difference amount representing the degree of the magnitude of the difference between each of the feature amounts larger than each of the corresponding relaxation values and each of the relaxation values corresponding to each of the feature amounts.

In the present embodiment, the calculation unit specifies the fundamental frequency from the received voice signal, and calculates the relaxation value in chronological order by changing the fundamental frequency so that the change in the specified fundamental frequency becomes moderate. The impression determination unit evaluates the voice signal based on the degree of the magnitude of the difference between the at least one feature amount related to the fundamental frequency and the relaxation value corresponding to the feature amount.

In the present embodiment, the relaxation value is a weighted average value of the current fundamental frequency calculated from the weighted average value of past fundamental frequencies and the current fundamental frequency specified from the voice signal. When calculating the relaxation value, the weight of the weighted average value of the past fundamental frequency is weighted by using the long-term weighting coefficient that changes the fundamental frequency so that the change of the fundamental frequency becomes moderate.

In the present embodiment, the feature amount is a weighted average value of the current fundamental frequency calculated by weighting the weight of the weighted average value of the past fundamental frequency and calculating from the weighted average value of the past fundamental frequency and the current fundamental frequency specified from the voice signal. When calculating the feature amount, the short-term weighting coefficient determined so that the degree of moderate change is smaller than in the case of calculating the relaxation value is used.

In the present embodiment, the difference amount representing the degree of the magnitude of the difference between at least one feature amount related to the fundamental frequency and the relaxation value corresponding to the feature amount is the square root of the sum of squares of the difference between the feature amount per unit utterance section and the relaxation value corresponding to the feature amount. In the present embodiment, the impression determination unit determines that the impression is bad in a case where the difference amount is smaller than the threshold value, and determines that the impression is good in a case where the difference amount is larger than the threshold value by a predetermined value or more.

In the present embodiment, by evaluating the voice signal based on the degree of the magnitude of the difference between the feature amount and the relaxation value corresponding to the feature amount, it is possible to improve the determination accuracy of the utterance impression. That is, in the present embodiment, it is possible to suppress erroneously determining a low tone voice as being a high tone voice even when the utterance duration is long and the fundamental frequency has a tendency to gradually decrease.

In the present embodiment, the utterance impression of the voice corresponding to the voice signal is determined based on the difference amount representing the degree of magnitude of the difference between each of the feature amounts and each of the relaxation values corresponding to each of the feature amounts. In the present embodiment, the feature amount is a weighted average value of the current fundamental frequency calculated by weighting the weight of the weighted average value of the past fundamental frequency and calculating from the weighted average value of the past fundamental frequency and the current fundamental frequency specified from the voice signal. When calculating the feature amount, the short-term weighting coefficient determined so that the degree of moderate change is smaller than in the case of calculating the relaxation value is used. That is, even when the fundamental frequency includes outliers, by using the weighted average value calculated using short-term weighting coefficients instead of the fundamental frequency, an outlier gives the utterance impression evaluation, and it is possible to reduce the influence of the outlier on the determination of the utterance impression and to improve the determination accuracy of the utterance impression.

Third Embodiment

Next, a third embodiment which is an example of the disclosed technology will be described. Descriptions of configurations and operations similar to those of the first embodiment and the second embodiment will be omitted.

Figure 9:
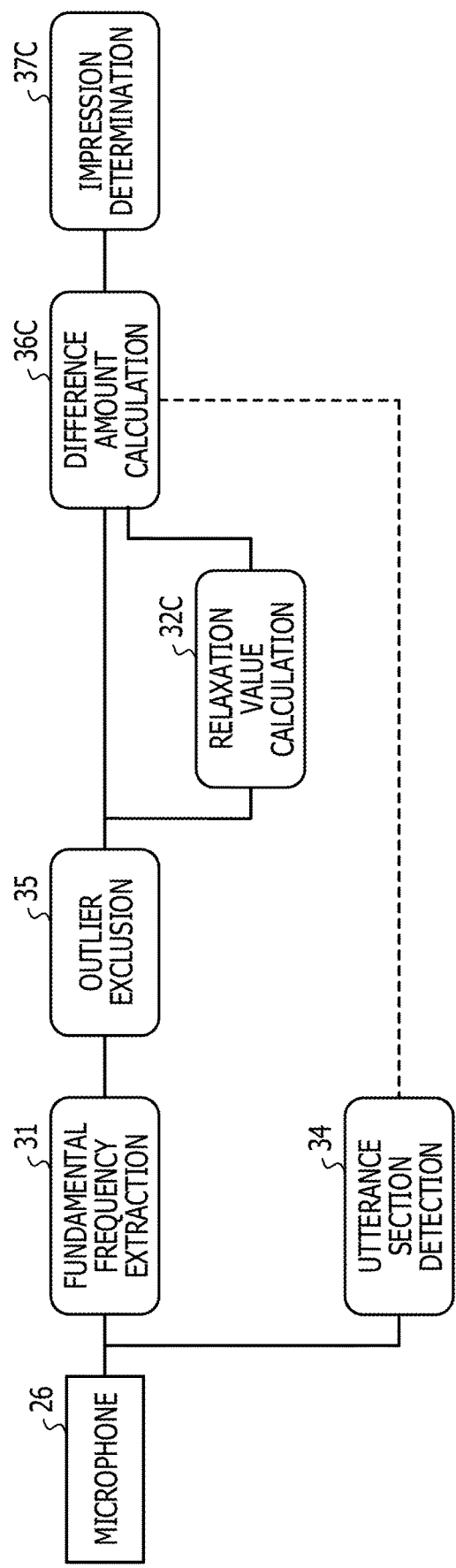
FIG. 9 is a block diagram for illustrating an outline of an example of the utterance impression determination process according to the third embodiment.

As illustrated in FIG. 9, the utterance impression determination device 10 acquires the user's uttered voice with the microphone 26. The utterance impression determination device 10 detects the utterance section with the block 34. The utterance section is a section including the user's uttered voice.

When it is detected in the block 34 that it is an utterance section, in the block 31, the utterance impression determination device 10 acquires the fundamental frequency from the voice signal corresponding to the user's uttered voice. In a case where there is the outlier in the fundamental frequency, the utterance impression determination device 10 excludes the outlier in a block 35. The utterance impression determination device 10 calculates a relaxation value by changing the fundamental frequency so that the change in the fundamental frequency becomes gentle in a block 32C.

When the utterance section is not detected in the block 34, that is, when the end of the utterance section is detected, in a block 36C, the utterance impression determination device 10 calculates a difference amount representing the degree of the magnitude of the difference between the fundamental frequency from which outliers are excluded and the relaxation value corresponding to the fundamental frequency for each unit utterance section. In a block 37C, the utterance impression determination device 10 determines the utterance impression for each unit utterance section based on the difference amount for each unit utterance section.

Figure 10A:
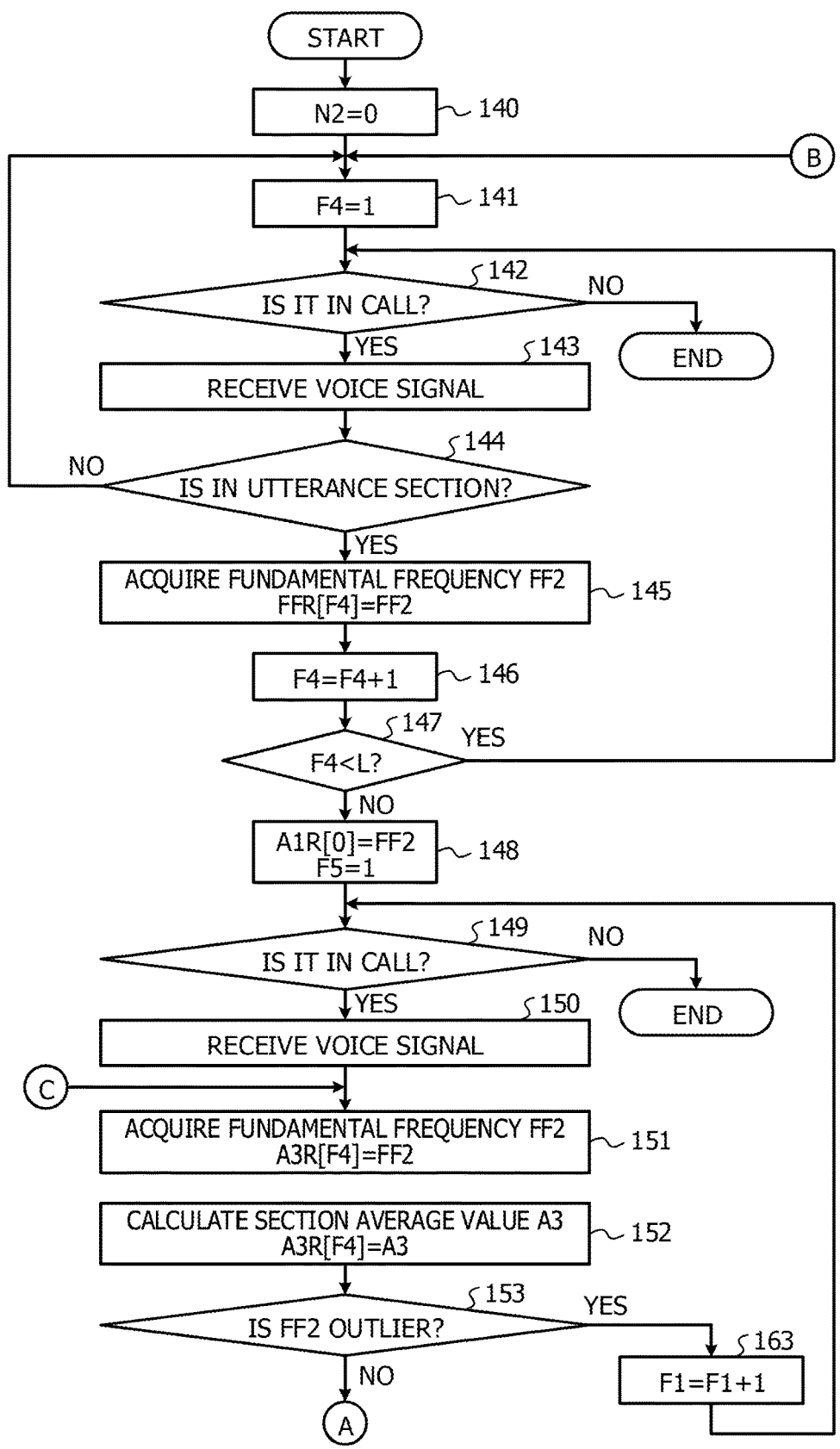
FIGS. 10A and 10B are a flowchart illustrating an example of the utterance impression determination process according to the third embodiment.
Figure 10B:
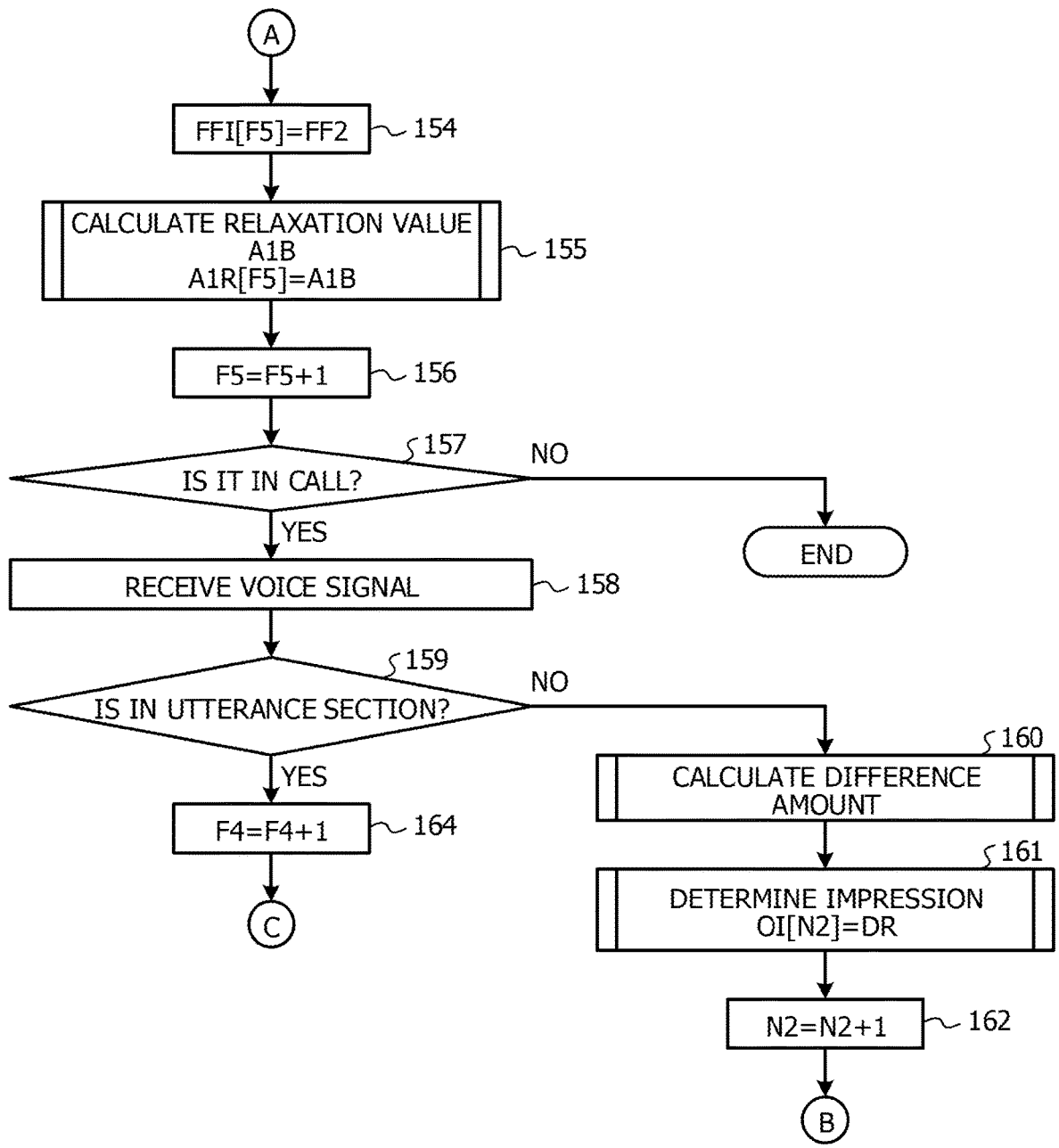

Next, the utterance impression determination process performed by the utterance impression determination device 10 will be described as an operation of the present embodiment. FIGS. 10A and 10B illustrate an example of the utterance impression determination process performed by the utterance impression determination device 10.

For example, by turning on a power supply of the utterance impression determination device 10 in a state where the user started a call, the utterance impression determination process of FIGS. 10A and 10B is started. In step 140, the CPU 21 sets 0 in the unit utterance section counter N2. In step 141, the CPU 21 sets 1 to the counter F4 (hereinafter, also referred to as the fourth frame counter F4) for counting the number of voice frames.

In step 142, the CPU 21 determines whether it is in a call. In a case where the determination is denied, that is, in a case where it is not in a call, the CPU 21 ends the utterance impression determination process, and in a case where the determination is affirmative, that is, in a case where it is in a call, the process proceeds to step 143.

In step 143, the CPU 21 receives the voice signal for one frame. The time length of one frame is, for example, 10 milliseconds. The voice signal is a voice signal detected by the microphone 26, that is, a voice signal corresponding to the uttered voice of the user, and is temporarily saved in the data storage area 23D of the secondary storage unit 23, for example.

In step 144, the CPU 21 determines whether the voice represented by the voice signal received in step 143 is the voice in the utterance section. Since step 144 is similar to step 123 in FIG. 7, the detailed description will be omitted.

In step 145, the CPU 21 acquires the fundamental frequency FF2 of the voice signal. Since the acquisition of the fundamental frequency FF2 is similar to step 104 of FIG. 4, the detailed description thereof will be omitted.

The CPU 21 stores the acquired fundamental frequency FF 2 in the array FFR [F4]. As described above, the FFR may be, for example, an array included in the data storage area 23D of the secondary storage unit 23. As described above, the fourth frame counter F4 stores the count value of the voice frame.

In step 146, the CPU 21 adds 1 to the count value of the fourth frame counter F4. In step 147, the CPU 21 determines whether the count value of the voice frame stored in the fourth frame counter F4 is smaller than the predetermined number of frames L. L may be, for example, 50. In a case where the determination at step 147 is affirmative, that is, in a case where the count value of the voice frame is smaller than the predetermined number of frames L, the CPU 21 returns to step 142 and repeats the processes at step 142 to step 146. On the other hand, in a case where the determination in step 147 is denied, that is, in a case where the count value of the voice frame is equal to or larger than the predetermined number of frames L, the CPU 21 proceeds to step 148.

In step 148, the CPU 21 sets 1 to the counter F5 for counting the number of voice frames (hereinafter, also referred to as the fifth frame counter F5) and stores the fundamental frequency FF2 as the initial value of the relaxation value in the array A1R [0]. In step 149, the CPU 21 determines whether it is in a call. In a case where the determination in step 149 is denied, that is, in a case where it is not in a call, the CPU 21 ends the utterance impression determination process, and in a case where the determination in step 149 is affirmative, that is, in a case where it is in a call, the CPU 21 proceeds to step 150. Since steps 150 and 151 are the similar to steps 143 and 145, respectively, the description thereof is omitted.

In step 152, the CPU 21 calculates a section average value A3. The section average value A3, for example, may be a moving average value which is an average of the fundamental frequencies of the L frames backward from the current fundamental frequency as illustrated in Equation (8). As described above, L may be, for example, 50. The section average value A3 is used to determine whether the fundamental frequency voice FF2 is an outlier as described later.

[Math. 4]

$$A3 = \frac{1}{L}\sum_{i=0}^{L-1} FFR[F4-i] \qquad (8)$$

Next, the CPU 21 stores the obtained section average value A3 in an array A3R [F4]. The array A3R may be, for example, an arrangement included in the data storage area 23D of the secondary storage unit 23. As described above, the fourth frame counter F4 stores the count value of the voice frame.

In step 153, the CPU 21 determines whether the fundamental frequency FF2 is the outlier value. Specifically, for example, as illustrated in Equation (9), the absolute value of the difference between the fundamental frequency FF2 stored in the fundamental frequency FFR [F4] and the section average value A3 calculated in step 152 stored in the array A3R [F4] is acquired. In a case where the absolute value of the difference is greater than the third threshold value TA, it is determined that the fundamental frequency stored in FFR [F4] is the outlier.

$$|FFR[F4]-A3R[F4]|>TA \qquad (9)$$

In a case where the determination in step 153 is affirmative, that is, in a case where the fundamental frequency FF2 stored in FFR [F4] is an outlier, the CPU 21 adds 1 to the count value of the fourth frame counter F4 in step 163, and the process returns to step 149. In a case where the determination in step 153 is denied, that is, in a case where the fundamental frequency FF2 stored in FFR [F4] is not outliers, the CPU 21 stores the fundamental frequency F2 in the array FFI [F5] in step 154. The FFI may be, for example, an arrangement included in the data storage area 23D of the secondary storage unit 23. The fifth frame counter F5 stores the count value of the voice frame as described above.

In step 155, the CPU 21 calculates a relaxation value A1B. As illustrated in Equation (10), the relaxation value A1B is, for example, a weighted average value of the current fundamental frequency, that is, the fundamental frequency FF2 stored in the array FFI [F5] and the past relaxation value, that is, the relaxation value stored in the array A1R [F5−1].

$$A1B=R3\times A1R[F5-1]+(1-R3)\times FFI[F5] \qquad (10)$$

The calculated relaxation value A1B is stored in the array A1R [F5].

Figure 11:
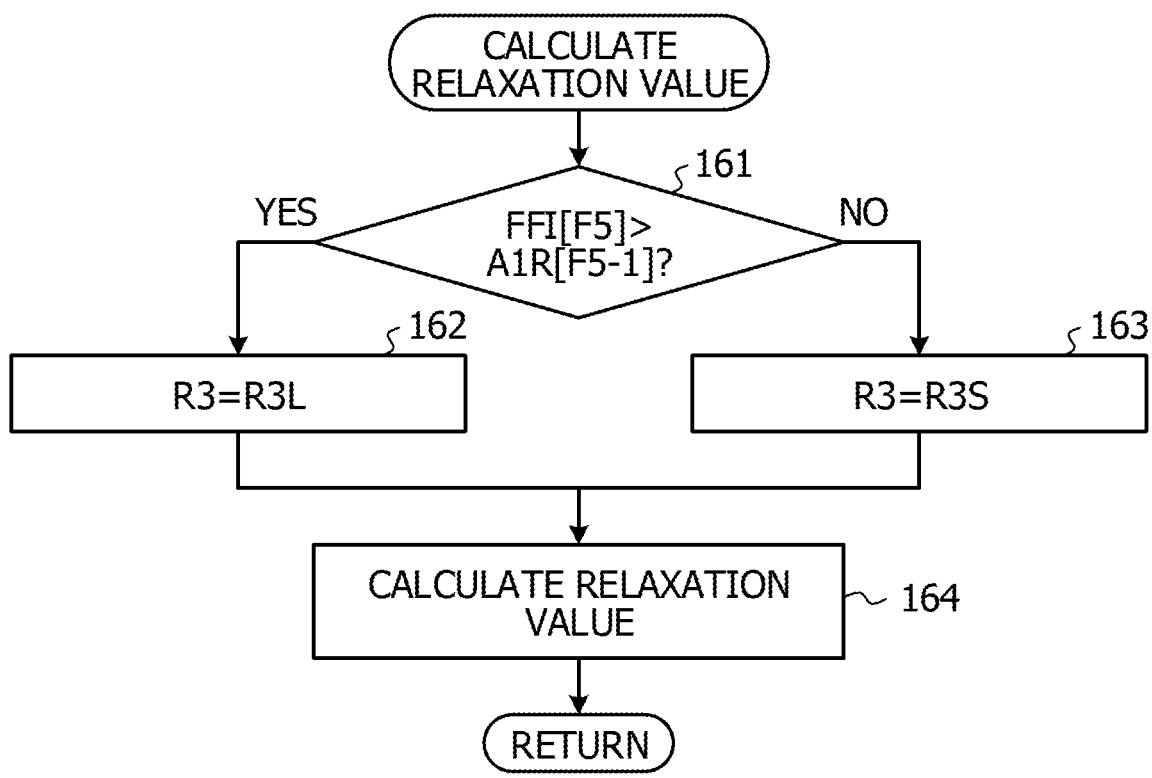
FIG. 11 is a flowchart illustrating an example of a relaxation value calculation process according to the third embodiment.

R3 which is an example of the long-term weighting coefficient is smaller than 1, larger than 1−R3, and the value of R3 is changed. With reference to FIG. 11, it is described how R3 is changed in step 155. In step 161, it is determined whether the current fundamental frequency FF2 stored in the array FFI [F5] is greater than the past relaxation value A1B stored in the array A1R [F5−1]. In a case where the determination in step 161 is affirmative, that is, in a case where the fundamental frequency FF2 stored in the FFI [F5] is larger than the relaxation value A1B stored in the array A1R [F5−1], in step 162, the CPU 21 sets the value R3L to R3. In step 164, the CPU 21 calculates the current relaxation value A1B, and the process proceeds to step 156.

On the other hand, in a case where the determination in step 161 is denied, that is, in a case where the fundamental frequency FF2 stored in FFI [F5] is less than or equal to the relaxation value A1B stored in the array A1R [F5−1], in step 163, the CPU 21 sets the value R3S to R3. The value R3S is smaller than the value R3L. The CPU 21 proceeds to step 164.

Figure 12:
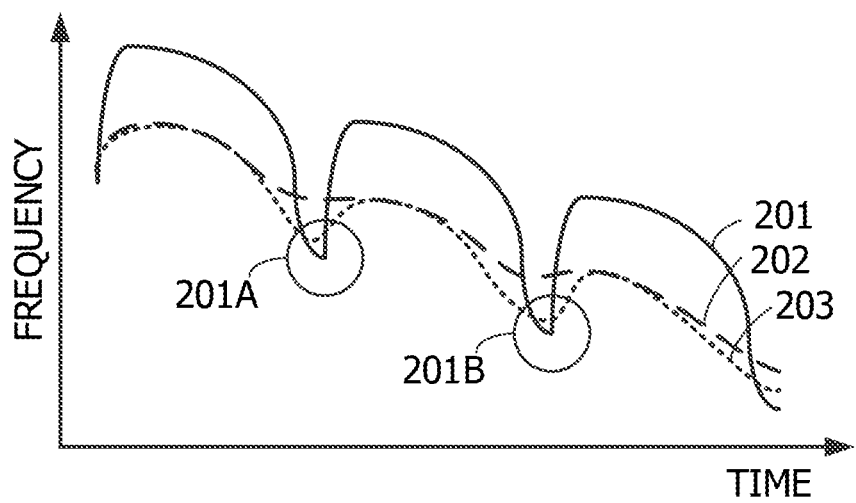
FIG. 12 is a conceptual diagram illustrating an example of a relaxation value according to the third embodiment.

That is, in a case where the fundamental frequency FF2 illustrates an increasing tendency, by increasing the value of R3, the influence of the past relaxation value is increased, and in the case where the fundamental frequency FF2 illustrates a decreasing tendency, by decreasing the value of R3, the influence of past relaxation value is reduced. Increasing the value of R3 is to increase the degree of moderate change, and reducing the value of R3 is to reduce the degree of moderate change. In FIG. 12, the vertical axis represents frequency and the horizontal axis represents time, and an example of the fundamental frequency of the voice signal is indicated by a solid line 201. In the case where the fundamental frequency indicated by the solid line 201 decreases sharply as indicated by a circle 201A and a circle 201B, by reducing the influence of the past relaxation value, the relaxation value can follow the rapid decrease of the fundamental frequency. The relaxation value following the rapid decrease of the fundamental frequency is exemplified by a broken line 203. On the other hand, in a case where the influence of the past relaxation value is not reduced, the relaxation value does not follow the change of the fundamental frequency as exemplified by a coarse broken line 202.

In step 156, the CPU 21 adds 1 to the count value of the fifth frame counter F5.

In step 157, the CPU 21 determines whether it is in a call. In a case where the determination is denied, that is, in a case where it is not in a call, the utterance impression determination process is ended.

In a case where the determination in step 157 is affirmative, the CPU 21 proceeds to step 158. Since steps 158 and 159 are similar to steps 143 and 144, the description will be omitted. In a case where the determination in step 159 is affirmative, that is, in a case where it is the utterance section, the CPU 21 adds 1 to the count value of the fourth frame counter F4 in step 164 and returns to step 151.

Figure 13:
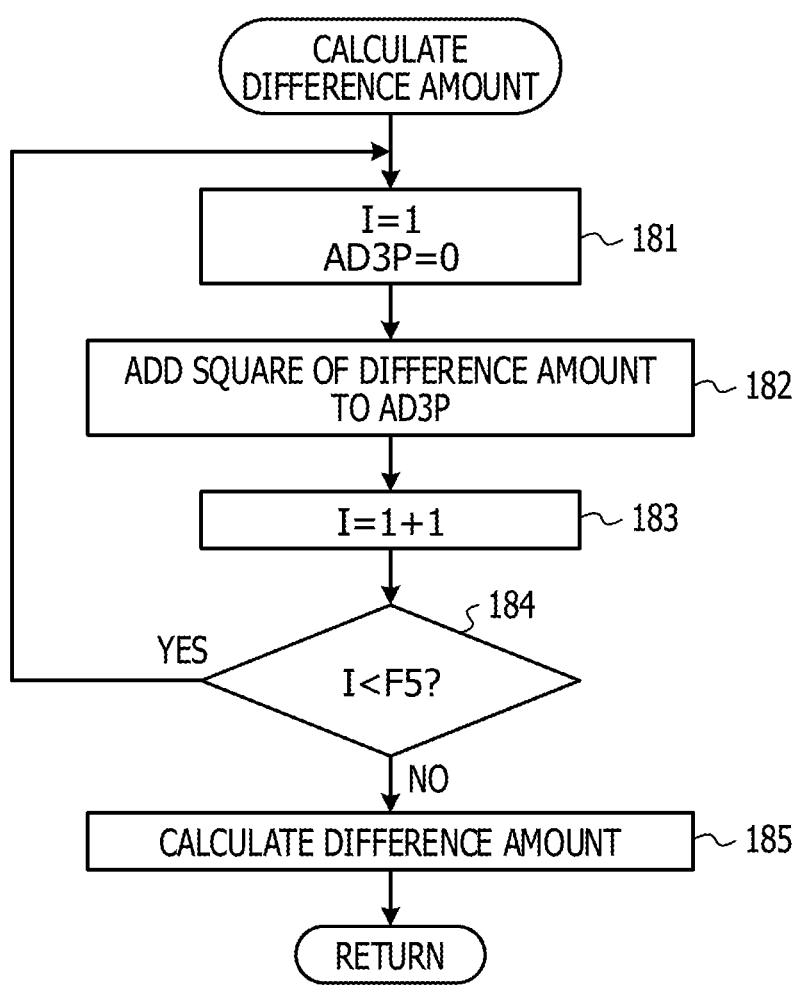
FIG. 13 is a flowchart illustrating an example of a difference amount calculation process according to the third embodiment.

In a case where the determination in step 159 is denied, that is, in a case where the end of the utterance section is determined, the CPU 21 calculates the difference amount in step 160. Specifically, as illustrated in FIG. 13, the CPU 21 sets 1 to the variable I and 0 to the variable AD3P in step 181. The variable I and the variable AD3P are included in the data storage area 23D of the secondary storage unit 23, for example.

In step 182, the CPU 21 adds the square of the relaxation value A1R [F5−I]−fundamental frequency FFI [F5−I] to the variable AD3P. In step 183, the CPU 21 adds 1 to the value set in the variable I, and in step 184 it is determined whether the value set in the variable I is smaller than the count value of the fifth frame counter F5. In a case where the determination in step 184 is affirmative, that is, in a case where the value set for the variable I is smaller than the count value of the fifth frame counter F5, the CPU 21 returns to step 181.

In a case where the determination in step 184 is denied, that is, in a case where the value set for the variable I is greater than or equal to the count value of the fifth frame counter F5, in step 185, for example, as illustrated in Equation (11), the difference amount AD 3 is calculated by the CPU 21, and the process proceeds to step 161.

[Math. 5]

$$AD3 = \frac{1}{F5-1}\sqrt{AD3P} \quad (11)$$

In Equation (11), the difference amount AD3 representing the degree of the magnitude of the difference between each of the fundamental frequencies excluding outliers and each of the relaxation values corresponding to each of the fundamental frequencies is calculated for each unit utterance section. That is, the difference amount AD3 is calculated using the fundamental frequency FF2 and the relaxation value A1B determined in step 153 that the fundamental frequency FF2 is not an outlier.

Since step 161 is similar to step 135 of FIG. 8, the description thereof is omitted. In step 163, the CPU 21 adds 1 to the count value of the unit utterance section counter N2 and returns to step 141.

Figure 14:
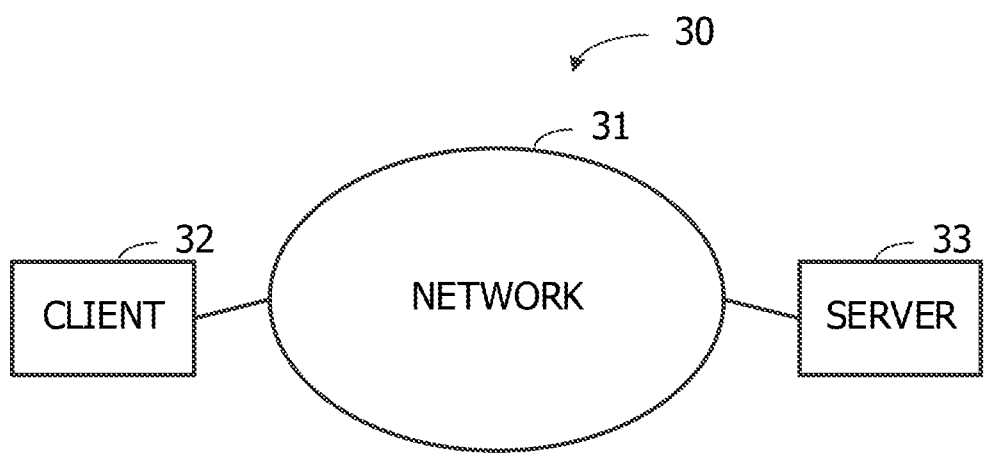
FIG. 14 is a block diagram illustrating an example of an utterance impression determination system.

In the first to third embodiments, the case where the utterance impression determination device 10 is physically a single device has been described. However, the first to third embodiments are not limited thereto. For example, as exemplified in FIG. 14, the utterance impression device 10 may be an utterance impression determination system 30 including a plurality of physically separate devices such as a client 32 and a server 33 connected via a network 31.

Figure 15A:
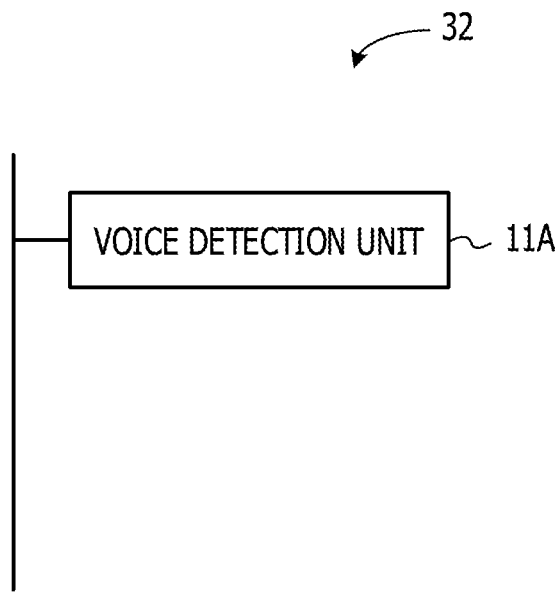
FIG. 15A is a block diagram illustrating an example of the main part function of a client of the utterance impression determination system.
Figure 15B:
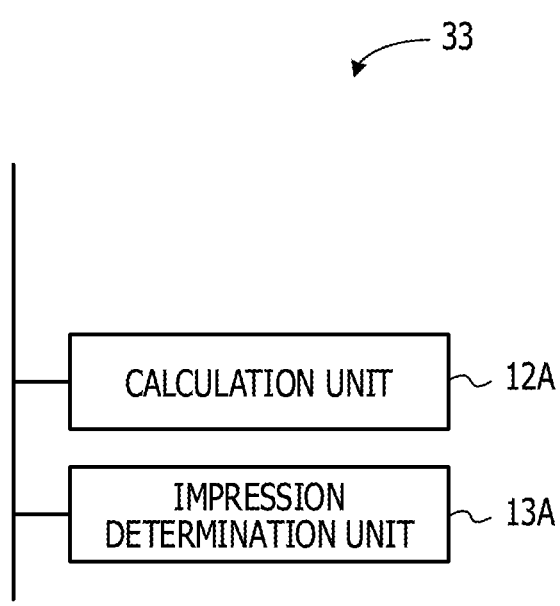
FIG. 15B is a block diagram illustrating an example of the main part function of a server of the utterance impression determination system.

In the utterance impression determination system 30, for example, as illustrated in FIG. 15A, the client 32 includes a voice detection unit 11A, and as illustrated in FIG. 15B, the server 33 may include a calculation unit 12A and an impression determination unit 13A. In addition, the client 32 may include the voice detection unit 11A and the calculation unit 12A, and the server 33 may include the impression determination unit 13A. In addition, the utterance impression determination system 30 may include a plurality of clients and a plurality of servers.

In the present embodiment, an example in which the utterance impression of the voice corresponding to the voice signal is determined was described based on the difference amount representing the degree of magnitude of the difference between each of the fundamental frequencies and each of the relaxation values corresponding to each of the fundamental frequencies. However, the present embodiment is not limited thereto. For example, the utterance impression of the voice corresponding to the voice signal may be determined based on the difference amount representing the degree of the magnitude of the difference between each of the fundamental frequencies larger than each of the corresponding relaxation values and each of the relaxation values corresponding to each of the fundamental frequencies.

In the first to third embodiments, the example in which the utterance impression determination process is applied to the real-time call has been described. However, the first to third embodiments are not limited thereto. For example, it may be applied to recorded calling or the voice of face-to-face correspondence. In this case, the threshold value used for determining the utterance impression may be determined based on the fundamental frequency of all voice signals corresponding to the voice of the recorded call or the face-to-face correspondence, for example. For example, the threshold used for when determining the utterance impression may be a value obtained by adding a predetermined value to the average value of the fundamental frequencies of all voice signals. In addition, threshold values used for determining utterance impressions acquired in a large number of calls or face-to-face correspondence are accumulated, and a threshold used when determining the utterance impression in a real-time call as in the first to third embodiments may be determined based on the accumulated numerous impression determination values.

In addition, in the first embodiment, when calculating the moving average value, an example in which the average value of the fundamental frequencies of a predetermined number of frames is calculated retroactively from the current fundamental frequency has been described. However, in the first embodiment, it is not limited thereto. For example, the average value of the fundamental frequency for the predetermined frame before a current fundamental frequency and the fundamental frequency for the predetermined frame after the current fundamental frequency may be calculated.

In the first to third embodiments, the fundamental frequency of unit semitone is used as the fundamental frequency. However, the first to third embodiments are not limited thereto. The fundamental frequency of unit Hz may be used as the fundamental frequency.

One or more parts of each of the first to third embodiments can be applied to different embodiments. For example, in the second embodiment and the third embodiment, the moving average value may be used as the relaxation value. In addition, for example, in the second embodiment, when the relaxation value is a moving average value, the moving average value in which the number of frames is reduced from the relaxation value may be used as the feature amount. For example, in a case where the relaxation value is a moving average value every 50 frames, the feature amount may be a moving average value every 10 frames. In addition, in the first embodiment, the weighted average value of the current fundamental frequency and the past relaxation value may be used as the relaxation value. In addition, in the first embodiment, the utterance impression is determined for each unit utterance section and the utterance impression may be determined per unit time in the second and third embodiments. The above description is an example, and modifications other than the above are also possible.

In addition, the flowcharts of FIGS. 4, 6, 8, 10, and 13 are merely examples, and the order of processing can be changed. An example in which the difference amount is calculated using Equation (4), Equation (7), and Equation (11) has been described. However, the present embodiment is not limited thereto. The difference amount may be a value representing the degree of magnitude of the difference between each of the feature amounts and each of the relaxation values corresponding to each of the feature amounts. In addition, an example in which the array, the counter, and the variables are included in the data storage area 23D of the secondary storage unit 23 has been described. However, the present embodiment is not limited thereto. The array, the counter, and the variable may be included in the primary storage unit 23, for example.

In the present embodiment, the calculation unit specifies the fundamental frequency from the received voice signal, and calculates the relaxation value in chronological order by changing the fundamental frequency so that the change in the specified fundamental frequency becomes moderate. The impression determination unit evaluates the voice signal based on the degree of the magnitude of the difference between the at least one feature amount related to the fundamental frequency and the relaxation value corresponding to the feature amount.

In the present embodiment, the relaxation value is a weighted average value of the current fundamental frequency calculated from the weighted average value of past fundamental frequencies and the current fundamental frequency specified from the voice signal. When calculating the relaxation value, the weight of the weighted average value of the past fundamental frequency is weighted by using the long-term weighting coefficient that changes the fundamental frequency so that the change of the fundamental frequency becomes moderate. In the present embodiment, in a case where the relaxation value is a weighted average value and the feature amount is equal to or less than the relaxation value corresponding to the feature amount, the long-term weighting coefficients are determined so that the degree of moderate change is smaller than in the case where the feature amount is larger than the relaxation value corresponding to the feature amount.

In the present embodiment, the feature amount is the fundamental frequency specified from the voice signal. In the present embodiment, the difference amount representing the degree of the magnitude of the difference between at least one feature amount related to the fundamental frequency and the relaxation value corresponding to the feature amount is the square root of the sum of squares of the difference between the feature amount per unit utterance section of impression determination and the relaxation value corresponding to the feature amount.

In the present embodiment, the impression determination unit determines that the impression is bad in a case where the difference amount is smaller than the threshold value, and determines that the impression is good in a case where the difference amount is larger than the threshold value by a predetermined value or more. In the present embodiment, in a case where an absolute value of the difference between the fundamental frequency and the average value of the fundamental frequency of the predetermined section corresponding to the fundamental frequency exceeds a predetermined value, the fundamental frequency is excluded in advance.

In the present embodiment, by evaluating the voice signal based on the degree of the magnitude of the difference between the feature amount and the relaxation value corresponding to the feature amount, it is possible to improve the determination accuracy of the utterance impression. That is, in the present embodiment, it is possible to suppress erroneously determining a low tone voice as being a high tone voice even when the utterance duration is long and the fundamental frequency has a tendency to gradually decrease. In addition, in the present embodiment, by excluding outliers from the fundamental frequency, it is possible to reduce the influence of outliers on the determination of the utterance impression, and it is possible to improve the determination accuracy of the utterance impression.

Figure 16A:
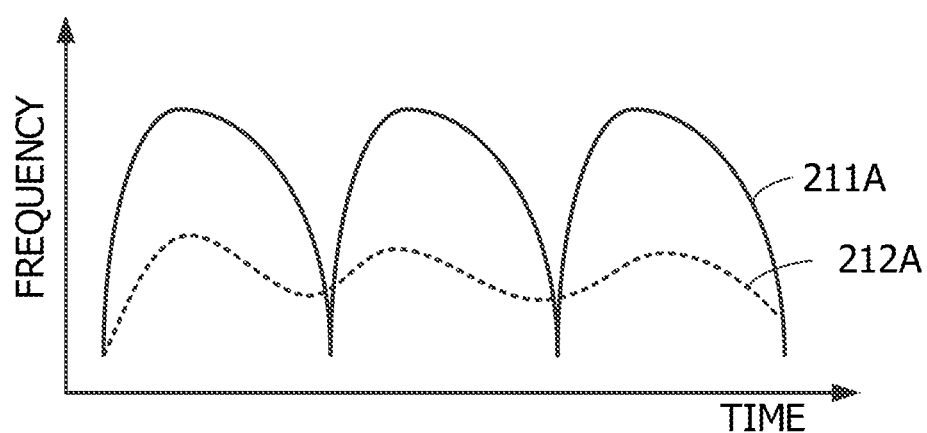
FIG. 16A is a conceptual diagram for illustrating the utterance impression determination process of the first to third embodiments.
Figure 16B:
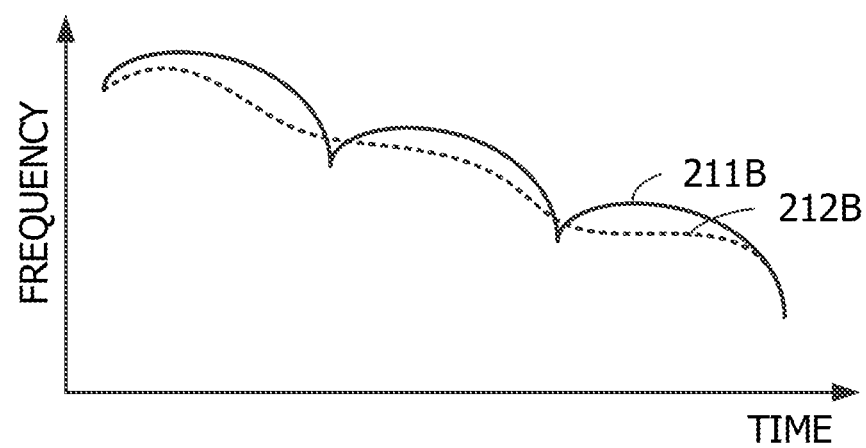
FIG. 16B is a conceptual diagram for illustrating the utterance impression determination process of the first to third embodiments.

As described above, in the first to third embodiments, the utterance impression is determined by using the difference amount representing the degree of the magnitude of the difference between the feature amount and the relaxation value corresponding to the feature amount. In FIG. 16A, a fundamental frequency, which is an example of the feature amount of the voice signal, is exemplified by a solid line 211A, and an example of a relaxation value corresponding to a fundamental frequency indicated by the solid line 211A is indicated by the broken line 212A. In addition, in FIG. 16B, an example of the fundamental frequency of the voice signal is indicated by a solid line 211B, and a relaxation value corresponding to the fundamental frequency indicated by the solid line 211B is indicated by a broken line 212B. In FIGS. 16A and 16B, the vertical axis represents frequency and the horizontal axis represents time.

Figure 17A:
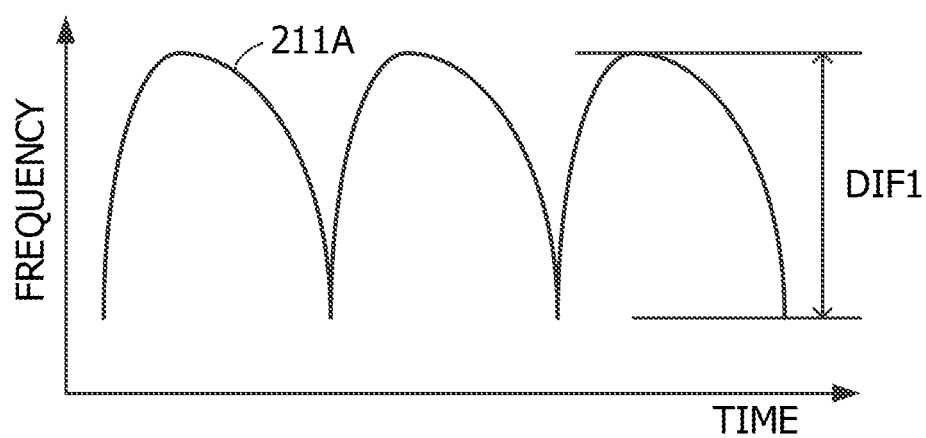
FIG. 17A is a conceptual diagram for illustrating the utterance impression determination process of a related art.
Figure 17B:
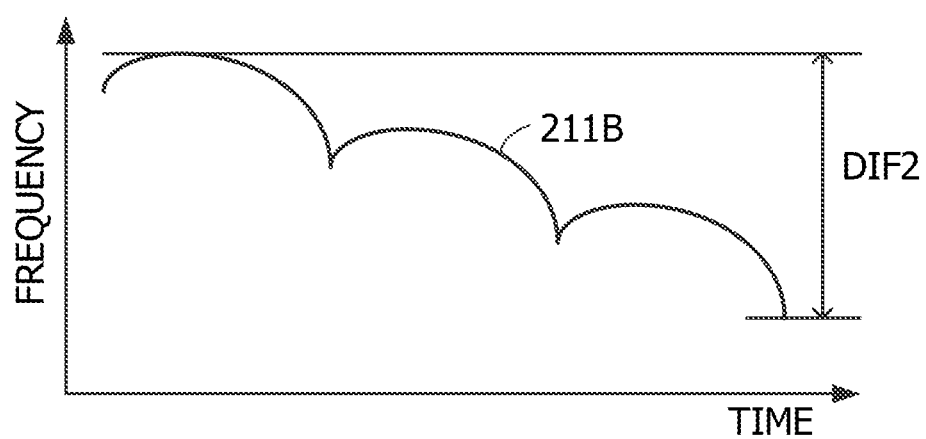
FIG. 17B is a conceptual diagram for illustrating the utterance impression determination process of the related art.

On the other hand, for example, there is a related technique for determining the utterance impression based on the difference between the maximum value and the minimum value of the fundamental frequency of the voice signal. In order to illustrate the related art, FIG. 17A illustrates an example of the same fundamental frequency as that of FIG. 16A by the solid line 211A, and FIG. 17B illustrates an example of the same fundamental frequency as the solid line 211B in FIG. 16B. In also FIGS. 17A and 17B, the vertical axis represents frequency and the horizontal axis represents time.

As illustrated in FIGS. 17A and 17B, the difference DIF1 between the maximum value and the minimum value of the fundamental frequency exemplified by the solid line 211A in FIG. 17A is approximately equal to the difference DIF2 between the maximum value and the minimum value of the fundamental frequency exemplified by the solid line 211B in FIG. 17B. Therefore, in a case where the utterance impression is determined based on the difference between the maximum value and the minimum value of the fundamental frequency of the voice signal, the degree of tone of the voice represented by the fundamental frequency exemplified by the solid line 211A and the degree of tone of the voice represented by the solid line 211B and the degree of the tone of the voice expressed by the fundamental frequency are approximately equal.

However, the degree of the utterance impression, that is, the degree of the tone of the subjectively perceived voice depends on the magnitude of the change in the fundamental frequency in a short time, that is, the intonation. Therefore, in practice, the degree of the tone of voice represented by the fundamental frequency exemplified by the solid line 211A is higher than the degree of the tone of voice represented by the fundamental frequency exemplified by the solid line 211B. As described above, when the degree of the tone of the voice is determined based on the difference between the maximum value and the minimum value of the fundamental frequency as exemplified by the solid line 211B, a low tone voice is mistakenly determined to be a high tone voice in some cases. The fundamental frequency as exemplified by the solid line 211B appears when the utterance duration is long and gradually tends to decrease.

The difference amount representing the degree of the magnitude of the difference between the fundamental frequency exemplified by the solid line 211A in FIG. 16A and the relaxation value corresponding to the fundamental frequency exemplified by the broken line 212A can appropriately express the change in the fundamental frequency in a short time. Further, the difference amount representing the degree of the magnitude of the difference between the fundamental frequency exemplified by the solid line 211B in FIG. 16B and the relaxation value exemplified by the broken line 212B corresponding to the fundamental frequency can also express the change in the fundamental frequency in a short time. This is because the relaxation value obtained by changing the fundamental frequency so that the change of the fundamental frequency is moderate can appropriately express the change in the fundamental frequency in a short time which is the reference of the magnitude of the difference from the fundamental frequency.

Therefore, according to the first to third embodiments, the utterance impression is appropriately determined such that the degree of the tone of the voice represented by the fundamental frequency exemplified by the solid line 211A in FIG. 16A is greater than the degree of the tone of the voice represented by the fundamental frequency exemplified by the solid line 211B in FIG. 16B. That is, even in the case where the utterance duration is long and the fundamental frequency tends to gradually decrease such that the voice represented by the fundamental frequency exemplified by the solid line 211B in FIG. 16B, in the first to third embodiments, the possibility of erroneous determination of the high tone voice as the low tone voice is low.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium that records a program for causing a computer to execute an utterance impression determination process of:
   specifying a fundamental frequency from a voice signal which is received;
   obtaining a relaxation value by calculating a weighted average value between the fundamental frequency and a past weighted average value, which is obtained in past, using a long-term weighting coefficient for changing the fundamental frequency gradually and by setting the calculated weighted average value as the relaxation value;
   obtaining a feature amount by calculating a weighted average value between the fundamental frequency and a past feature amount, which is obtained in past, using a short-term weighting coefficient which is smaller than the long-term weighting coefficient and by setting the calculated weighted average value as the feature amount;
   evaluating the voice signal based on a degree of a magnitude of a difference between the feature amount and the relaxation value; and
   determining, when the feature amount is equal to or less than the relaxation value corresponding to the feature amount, the long-term weighting coefficient in such a manner that a degree of gradual change is smaller than in the case where the feature amount is greater than the relaxation value corresponding to the feature amount.

2. The non-transitory computer-readable recording medium according to claim 1, wherein the weighted average is calculated by an equation:

$$A1A=R1 \times A1R[F3-1]+(1-R1) \times FFR[F3],$$

wherein A1A indicates the weighted average, R1 indicates the long-term weighting coefficient, A1R [F3−1] indicates the past weighted average value and FFR [F3] indicates the fundamental frequency.

3. The non-transitory computer-readable recording medium according to claim 1, wherein the feature amount is calculated by an equation:

$$A2=R2 \times A2R[F3-1]+(1-R2) \times FFR[F3],$$

wherein A2 indicates the feature amount, R2 indicates the short-term weighting coefficient, A2R [F3−1] indicates the past feature amount and FFR [F3] indicates the fundamental frequency.

4. The non-transitory computer-readable recording medium according to claim 1, wherein a difference amount representing the degree of the magnitude of the difference is a square root of the sum of squares of the difference between the feature amount and the relaxation value corresponding to the feature amount per unit time or per unit utterance interval of impression determination.

5. The non-transitory computer-readable recording medium according to claim 1, wherein in a case where a difference amount representing the degree of the magnitude of the difference is smaller than a threshold value, it is determined that an impression is bad, and in a case where the difference amount is greater than the threshold value by a value or more, it is determined that the impression is good.

6. The non-transitory computer-readable recording medium according to claim 5, wherein the threshold value is determined based on an average value of all voice signals.

7. The non-transitory computer-readable recording medium according to claim 1, wherein in a case where an absolute value of the difference between the current fundamental frequency and the average value of a fundamental frequency of the section corresponding to the fundamental frequency exceeds a value, the fundamental frequency is excluded in advance.

8. An utterance impression determination method comprising:
   specifying, by a computer, a fundamental frequency from a voice signal which is received;
   obtaining a relaxation value by calculating a weighted average value between the fundamental frequency and a past weighted average value, which is obtained in past, using a long-term weighting coefficient for changing the fundamental frequency in chronological order so that the change gradually and by setting the calculated weighted average value as the relaxation value;
   obtaining a feature amount by calculating a weighted average value between the fundamental frequency and a past feature amount, which is obtained in past, using a short-term weighting coefficient which is smaller than the long-term weighting coefficient and by setting the calculated weighted average value as the feature amount;
   evaluating the voice signal based on a degree of a magnitude of a difference between the feature amount and the relaxation value; and
   determining, when the feature amount is equal to or less than the relaxation value corresponding to the feature amount, the long-term weighting coefficient in such a manner that a degree of gradual change is smaller than in the case where the feature amount is greater than the relaxation value corresponding to the feature amount.

9. The utterance impression determination method according to claim 8, wherein the weighted average is calculated by an equation:

$$A1A = R1 \times A1R[F3-1] + (1-R1) \times FFR[F3],$$

wherein AIA indicates the weighted average, R1 indicates the long-term weighting coefficient, A1R [F3−1] indicates the past weighted average value and FFR [F3] indicates the fundamental frequency.

10. The utterance impression determination method according to claim 8, wherein the feature amount is calculated by an equation:

$$A2 = R2 \times A2R[F3-1] + (1-R2) \times FFR[F3],$$

wherein A2 indicates the feature amount, R2 indicates the short-term weighting coefficient, A2R [F3−1] indicates the past feature amount and FFR [F3] indicates the fundamental frequency.

11. The utterance impression determination method according to claim 8, wherein a difference amount representing the degree of the magnitude of the difference is a square root of the sum of squares of the difference between the feature amount and the relaxation value corresponding to the feature amount per unit time or per unit utterance interval of impression determination.

12. The utterance impression determination method according to claim 8, wherein in a case where a difference amount representing the degree of the magnitude of the difference is smaller than a threshold value, it is determined that an impression is bad, and in a case where the difference amount is greater than the threshold value by a value or more, it is determined that the impression is good.

13. The utterance impression determination method according to claim 12, wherein the threshold value is determined based on an average value of all voice signals.

14. The utterance impression determination method according to claim 8, wherein in a case where an absolute value of the difference between the fundamental frequency and the average value of a fundamental frequency of the section corresponding to the fundamental frequency exceeds a value, the fundamental frequency is excluded in advance.

15. An information processing apparatus comprising:
   a memory; and
   a processor coupled to the memory and configured to execute a process of:
      specifying a fundamental frequency from a voice signal which is received;
      obtaining a relaxation value by calculating a weighted average value between the fundamental frequency and a past weighted average value, which is obtained in past, using a long-term weighting coefficient for changing the fundamental frequency gradually and by setting the calculated weighted average value as the relaxation value;
      obtaining a feature amount by calculating a weighted average value between the fundamental frequency and a past feature amount, which is obtained in past, using a short-term weighting coefficient which is smaller than the long-term weighting coefficient and by setting the calculated weighted average value as the feature amount;
      evaluating the voice signal based on a degree of a magnitude of a difference between the feature amount and the relaxation value; and
      determining, when the feature amount is equal to or less than the relaxation value corresponding to the feature amount, the long-term weighting coefficient in such a manner that a degree of gradual change is smaller than in the case where the feature amount is greater than the relaxation value corresponding to the feature amount.

16. The information processing apparatus according to claim 15, wherein the weighted average is calculated by an equation:

$$A1A = R1 \times A1R[F3-1] + (1-R1) \times FFR[F3],$$

wherein AIA indicates the weighted average, R1 indicates the long-term weighting coefficient, A1R [F3−1] indicates the past weighted average value and FFR [F3] indicates the fundamental frequency.

17. The information processing apparatus according to claim 15, wherein the feature amount is calculated by an equation:

$$A2 = R2 \times A2R[F3-1] + (1-R2) \times FFR[F3],$$

wherein A2 indicates the feature amount, R2 indicates the short-term weighting coefficient, A2R [F3−1] indicates the past feature amount and FFR [F3] indicates the fundamental frequency.

* * * * *